US010133303B2

(12) United States Patent
Park et al.

(10) Patent No.: US 10,133,303 B2
(45) Date of Patent: *Nov. 20, 2018

(54) DISPLAY DEVICE

(71) Applicant: Samsung Display Co., Ltd., Yongin (KR)

(72) Inventors: Chang Min Park, Gwangmyeong-si (KR); Sang Wol Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/407,885

(22) Filed: Jan. 17, 2017

(65) Prior Publication Data

US 2017/0123455 A1 May 4, 2017

Related U.S. Application Data

(63) Continuation of application No. 14/806,899, filed on Jul. 23, 2015, now Pat. No. 9,600,035.

(30) Foreign Application Priority Data

Sep. 23, 2014 (KR) .................. 10-2014-0126961

(51) Int. Cl.
*G06F 1/16* (2006.01)
*H04M 1/02* (2006.01)

(52) U.S. Cl.
CPC .......... *G06F 1/1616* (2013.01); *G06F 1/1652* (2013.01); *G06F 1/1681* (2013.01); *H04M 1/0268* (2013.01)

(58) Field of Classification Search
CPC .... G06F 1/1681; G06F 1/1616; G06F 1/1641; G06F 1/1652; G06F 1/1679;
(Continued)

(56) References Cited

U.S. PATENT DOCUMENTS 4,961,126 A * 10/1990 Suzuki .................. G06F 1/1616
16/223
8,804,324 B2 * 8/2014 Bohn .................... G06F 1/1616
345/1.1
(Continued)

FOREIGN PATENT DOCUMENTS

KR 10-2012-0049762 5/2012

OTHER PUBLICATIONS

Notice of Allowance dated Oct. 17, 2016 in U.S. Appl. No. 14/806,899.

*Primary Examiner* — Dimary Lopez Cruz
*Assistant Examiner* — Abhishek Rathod
(74) *Attorney, Agent, or Firm* — H.C. Park & Associates, PLC

(57) ABSTRACT

A display device includes a bottom chassis including first and second bottom portions, a mold frame including first and second frame portions disposed in respective first and second bottom portions, a hinge portion configured to couple the first and second frame portions to each other, a flexible display panel disposed on the mold frame and the hinge portion, a first curvature adjusting portion disposed between one side of the hinge portion and the display panel and coupled to the first frame portion, a second curvature adjusting portion disposed between the opposite side of the hinge portion and the display panel and coupled to the second frame portion, a first support portion coupled to the hinge portion and configured to support the first curvature adjusting portion, and a second support portion coupled to the hinge portion and configured to support the second curvature adjusting portion.

21 Claims, 11 Drawing Sheets

(58) Field of Classification Search
CPC .. H04M 1/0268; H04M 1/022; H04M 1/0216; H04M 1/0247; H05K 1/028; H05K 5/0017

See application file for complete search history.

(56) References Cited

U.S. PATENT DOCUMENTS

| | | | |
|---|---|---|---|
| 9,600,035 B2* | 3/2017 | Park | G06F 1/1681 |
| 2004/0036818 A1* | 2/2004 | Kim | G02F 1/13336 349/58 |
| 2009/0236411 A1 | 9/2009 | Silverbrook | |
| 2010/0232100 A1* | 9/2010 | Fukuma | F16G 13/18 361/679.01 |
| 2012/0264489 A1* | 10/2012 | Choi | H04M 1/0216 455/566 |
| 2012/0307423 A1 | 12/2012 | Bohn et al. | |
| 2013/0021762 A1* | 1/2013 | van Dijk | G06F 1/1652 361/749 |
| 2013/0037228 A1 | 2/2013 | Verschoor et al. | |
| 2013/0155655 A1* | 6/2013 | Lee | H05K 5/03 362/97.1 |
| 2013/0342090 A1* | 12/2013 | Ahn | G09F 9/33 312/258 |
| 2014/0111954 A1* | 4/2014 | Lee | G06F 1/1641 361/749 |
| 2014/0126133 A1* | 5/2014 | Griffin | G06F 1/1616 361/679.27 |
| 2015/0062525 A1* | 3/2015 | Hirakata | G02F 1/133305 349/158 |
| 2015/0233162 A1* | 8/2015 | Lee | H04M 1/02 16/223 |
| 2016/0195901 A1* | 7/2016 | Kauhaniemi | G06F 1/1652 361/679.27 |

* cited by examiner

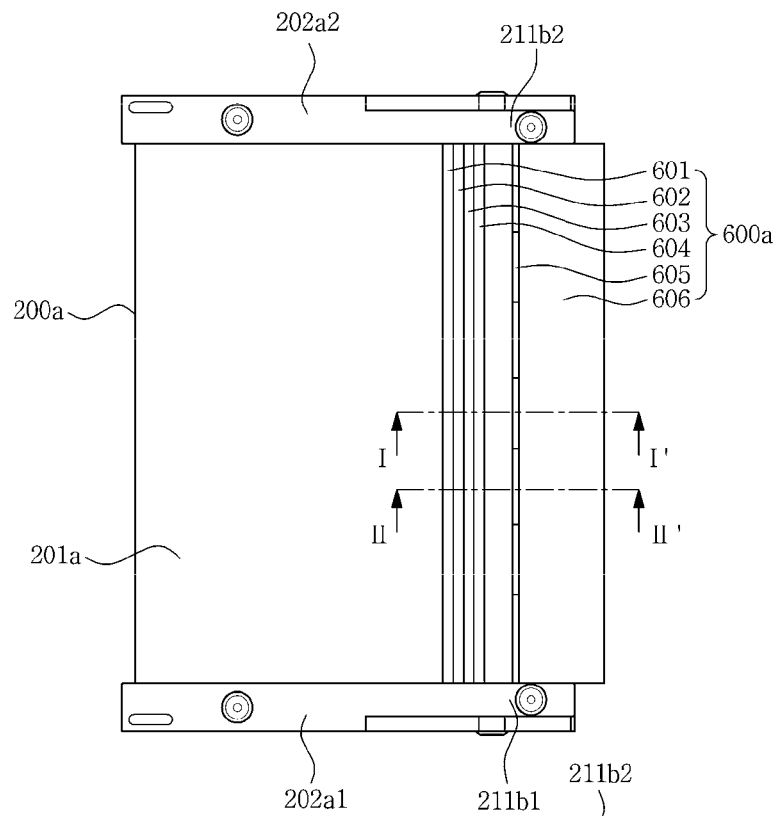
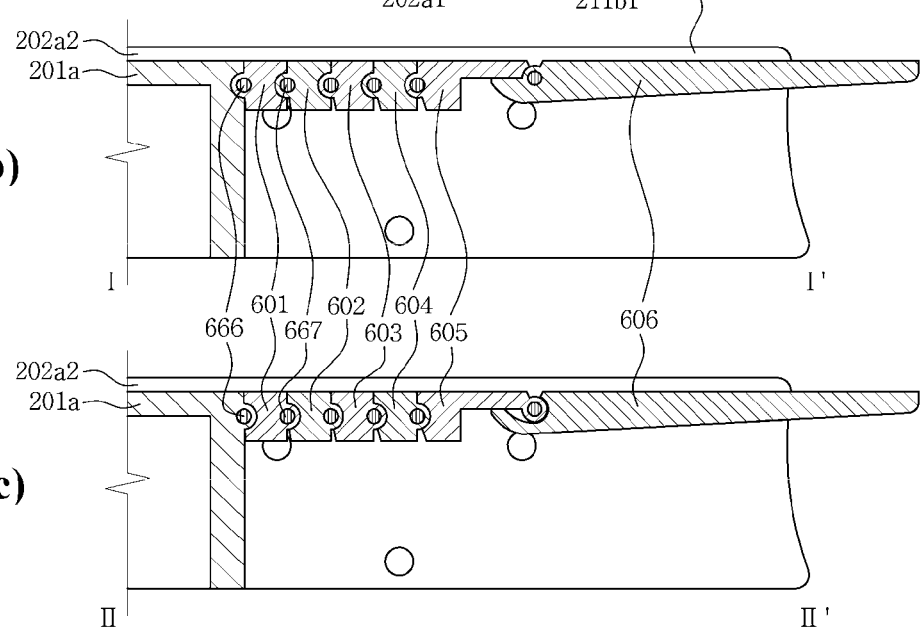
FIG. 7(a)
FIG. 7(b)
FIG. 7(c)

DISPLAY DEVICE

CROSS-REFERENCE TO RELATED APPLICATION

This application is a continuation of U.S. patent application Ser. No. 14/806,899, filed on Jul. 23, 2015, and claims priority from and the benefit of Korean Patent Application No. 10-2014-0126961, filed on Sep. 23, 2014, which is hereby incorporated by reference for all purposes as if fully set forth herein.

BACKGROUND

Field

Exemplary embodiments of the invention relate to a display device including a flexible display panel, the display device configured to reduce excessive folding of a curved portion of a display panel.

Discussion of the Background

A foldable display device may include a flexible display panel that is bendable. The foldable display device may be portable and have a large screen when unfolded, and to be used in various applications such as a television, a monitor, and a mobile device, e.g., mobile phone, ultra-mobile PC, e-books, and e-newspaper.

A high stress may be applied onto a curved portion of the folded flexible display device. The high stress applied to the curved portion may damage elements near the curved portion.

The above information disclosed in this Background section is only for enhancement of understanding of the background of the inventive concept, and, therefore, it may contain information that does not form the prior art that is already known in this country to a person of ordinary skill in the art.

SUMMARY

One or more exemplary embodiments provide a display device configured to stably control curvature of a curved portion of the display device so as to reduce or effectively prevent excessive folding of the curved portion.

Additional aspects will be set forth in the detailed description which follows, and, in part, will be apparent from the disclosure, or may be learned by practice of the inventive concept.

According to one or more exemplary embodiments, a display device includes: a bottom chassis including a first bottom portion and a second bottom portion; a mold frame including a first frame portion and a second frame portion respectively disposed in the first and second bottom portions of the bottom chassis; a hinge portion configured to couple the first and second frame portions of the mold frame to each other; a flexible display panel disposed on the mold frame and the hinge portion; a first curvature adjusting portion disposed between one side of the hinge portion and the flexible display panel, the first curvature adjusting portion coupled to the first frame portion; a second curvature adjusting portion disposed between the opposite side of the hinge portion and the display panel, the second curvature adjusting portion coupled to the second frame portion; a first support portion coupled to the hinge portion, the first support portion configured to support the first curvature adjusting portion; and a second support portion coupled to the hinge portion, the second support portion configured to support the second curvature adjusting portion.

Each of the first and second curvature adjusting portions comprises a plurality of adjustment units and a plurality of connecting shafts configured to hinge couple the plurality of adjustment units to each other.

At least two of the plurality of adjustment units have different angular rotation ranges.

An adjustment unit of the plurality of adjustment units that is substantially closer to the hinge portion has a larger angular rotation range.

At least one of the plurality of adjustment units have a upper surface and a lower surface having different lengths from each other.

An adjustment unit of the plurality of adjustment units disposed furthest from the hinge portion comprises a surface that comprises a projection and groove comprising a hole through which the connecting shaft is inserted.

Each adjustment unit of the plurality of adjustment units other than an adjustment unit of the plurality of adjustment units disposed furthest from the hinge portion comprise a surface comprising at least one first projection and at least one first groove having a first hole, alternately disposed, the connecting shaft is inserted through the first hole of the first groove and an opposite surface comprising at least one second projection and at least one second groove having a second hole, alternately disposed, the connecting shaft is inserted through the second hole of the second groove.

The second groove is disposed corresponding to the first projection and the second projection is disposed corresponding to the first groove.

The first and second grooves disposed closer from the hinge portion is smaller than the first and second grooves disposed further from the hinge portion.

Each of the plurality of adjustment units comprises a reference adjustment unit, at least one curved adjustment unit between any one of the first and second frame portions and an end portion of the reference adjustment unit and at least one straight adjustment unit hinge coupled to the opposite end portion of the reference adjustment unit.

The curved adjustment unit is configured to rotate in a range that does not intersect an imaginary reference surface extending from a surface of the reference adjustment unit; and wherein the straight adjustment unit is configured to rotate in a range that intersects (or crosses) the imaginary reference surface.

The hinge portion comprises: a shaft receiving portion and a hinge case comprising a first gear receiving portion and a second gear receiving portion disposed respectively on two sides of the shaft receiving portion; a first hinge shaft and a second hinge shaft disposed in the shaft receiving portion; a first gear and a second gear disposed in the first gear receiving portion, the first and second gears are interlocked with each other; a third gear and a fourth gear disposed in the second gear receiving portion, the third and fourth gears are interlocked with each other; a first gear cover covering a first opening formed in the first gear receiving portion, the first gear cover comprising through holes through which axes of the first and second gears are respectively disposed and exposed outwards; a second gear cover covering a second opening formed in the second gear receiving portion, the second gear cover comprising through holes through which axes of the third and fourth gears are respectively disposed and exposed outwards; a first coupling portion coupling the axis of the first gear to one side of the first frame portion; a second coupling portion coupling the axis of the third gear to the opposite side of the first frame portion; a third coupling portion coupling the axis of the second gear to one side of the second frame portion; and a fourth coupling portion coupling the axis of the fourth gear to the opposite side of the second frame portion.

The hinge portion further comprises a washer disposed on at least one of positions between one side of the first gear cover and the first coupling portion, between the opposite side of the first gear cove and the third coupling portion, between one side of the second gear cover and the second coupling portion, and between the opposite side of the second gear cover and the fourth coupling portion.

The first gear receiving portion comprises through holes into which the axes of the first and second gears are inserted; and wherein the second gear receiving portion comprises through holes into which the axes of the third and fourth gears are inserted.

The shaft receiving portion comprises: first fixing grooves into which two ends of the first hinge shaft are respectively inserted; second fixing grooves into which two ends of the second hinge shaft are respectively inserted; at least one first support groove configured to support a central portion of the first hinge shaft; and at least one second support groove configured to support a central portion of the second hinge shaft.

The first support portion is coupled to the first hinge shaft and the second support portion is coupled to the second hinge shaft.

The first support portion comprises: at least one rotation unit rotatably coupled to the first hinge axis; at least one first support plate protruding from the rotation unit towards one side of the first curvature adjusting portion; and at least one second support plate protruding from the rotation unit towards another side of the first curvature adjusting portion.

At least one hinge spring coupled to the first hinge axis, one end of the hinge spring disposed on the first support plate and the other end of the hinge spring disposed on the shaft receiving portion.

The second support portion comprises: at least one rotation unit rotatably coupled to the second hinge axis; at least one first support plate protruding from the rotation unit towards one side of the second curvature adjusting portion; and at least one second support plate protruding from the rotation unit towards another side of the second curvature adjusting portion.

At least one hinge spring coupled to the second hinge axis, one end of the hinge spring disposed on the first support plate and the other end of the hinge spring disposed on the shaft receiving portion.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 7(a) is a plan view illustrating a structure of a first frame portion and a first curvature adjusting portion coupled to each other according to one or more exemplary embodiments, and a FIGS. 7(b) and 7 (c) are cross-sectional views respectively taken along sectional lines I-I' and II-II' of the structure of the first frame portion and the first curvature adjusting portion, according to one or more exemplary embodiments.

DETAILED DESCRIPTION OF THE ILLUSTRATED EMBODIMENTS

Figure 1:
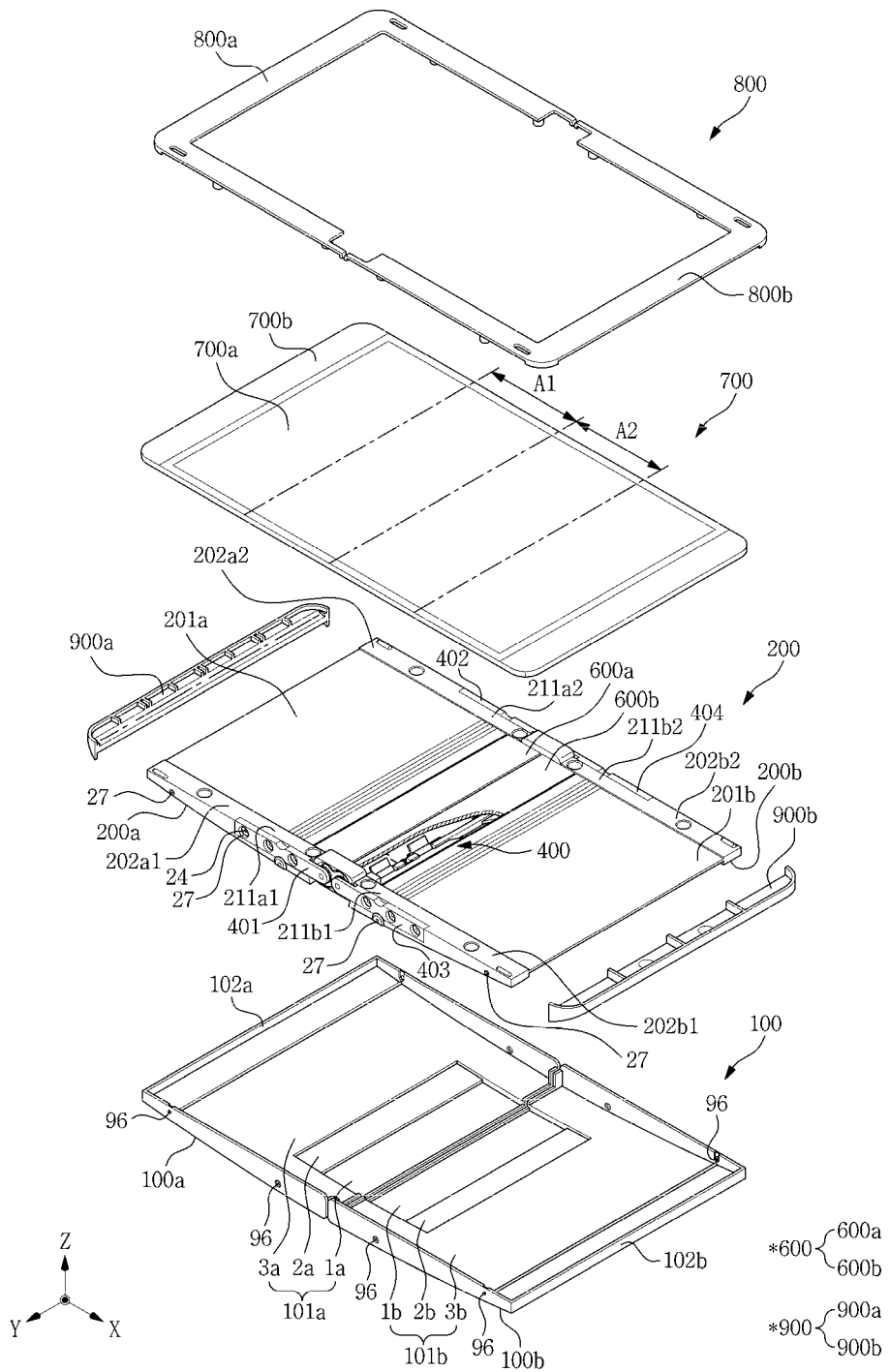
FIG. 1 is a perspective view illustrating a display device according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to plan and/or sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
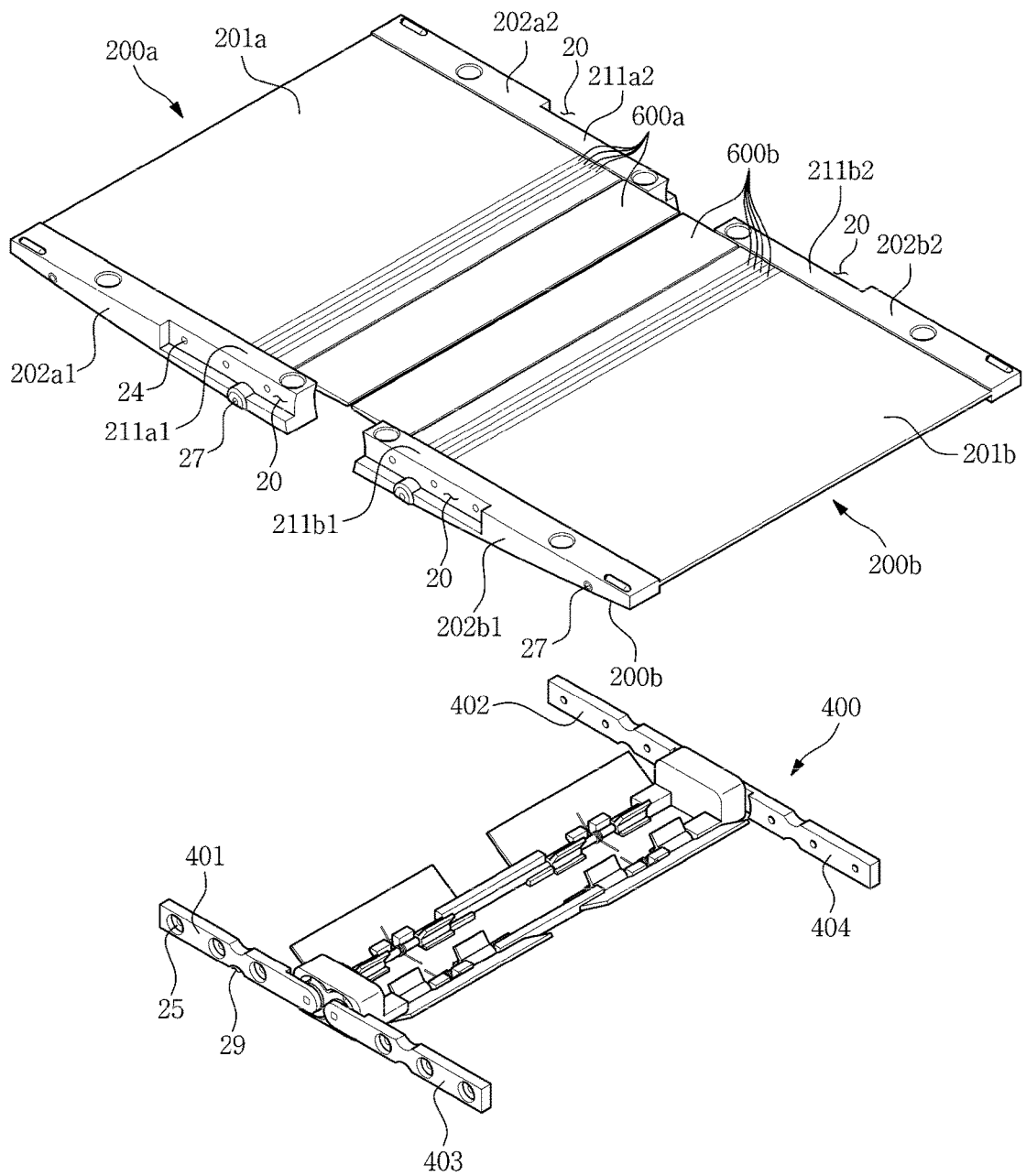
FIG. 2 is a perspective view illustrating a mold frame and a hinge portion illustrated in FIG. 1, disassembled from each other, according to one or more exemplary embodiments.

FIG. 1 is a perspective view illustrating a display device according to one or more exemplary embodiments. FIG. 2 is a perspective view illustrating a mold frame and a hinge portion shown in FIG. 1, disassembled from each other, according to one or more exemplary embodiments.

Referring to FIGS. 1 and 2, a display device according to an exemplary embodiment of the invention includes a bottom chassis 100, a mold frame 200, a hinge portion 400, a support portion 500 (refer to FIG. 3), a curvature adjusting portion 600, a flexible display panel 700, and a top chassis 800.

The bottom chassis 100 may include a first bottom portion 100a and a second bottom portion 100b. The first and second bottom portions 100a and 100b may be separated from each other. The first and second bottom portions 100a and 100b may be substantially symmetric to each other with respect to a Y-axis.

The first bottom portion 100a may include a base portion 101a and a plurality of side portions 102a. The plurality of side portions 102a may protrude from four respective edge portions of the base portion 101a by a predetermined height. Among the four side portions 102a, a side portion disposed corresponding to a center of the bottom chassis 100 may have the lowest height.

The lowest side portion 102a disposed corresponding to a center of the bottom chassis 100 may be defined as a first side portion, and a side portion disposed facing the first side portion may be defined as a second side portion. The first bottom portion 100a may be curved along a direction from the first side portion towards the second side portion.

The base portion 101a may have an inner surface including a first surface 1a, a second surface 2a, and a third surface 3a, each having heights different from each other. The first to third surfaces 1a, 2a, and 3a may have a stair shape having gradually higher height from the first side portion to the second side portion. The first surface 1a may have a height lower than the second surface 2a, and the second surface 2a may have a height lower than the third surface 3a.

The second bottom portion 100b may include a base portion 101b and a plurality of side portions 102b, which is similar to the first bottom portion 100a. The plurality of side portions 102b may protrude from four respective edge portions of the base portion 101b by a predetermined height. Among the four side portions 102b, a side portion disposed corresponding to a center of the bottom chassis 100 may have the lowest height.

The lowest side portion 102b disposed corresponding to a center of the bottom chassis 100 may be defined as a first side portion, and a side portion disposed facing the first side portion may be defined as a second side portion. The second bottom portion 100b may be curved along a direction from the first side portion towards the second side portion.

The base portion 101b may have an inner surface including a first surface 1b, a second surface 2b, and a third surface 3b, each having heights different from each other. The first to third surfaces 1b, 2b, and 3b may have a stair shape having gradually higher height from the first side portion to the second side portion. The first surface 1b may have a height lower than the second surface 2b, and the second surface 2b may have a height lower than the third surface 3b.

The mold frame 200 may include a first frame portion 200a and a second frame portion 200b. The first and second frame portions 200a and 200b may be separated from each other. The first and second frame portions 200a and 200b may be substantially symmetric to each other with respect to the Y-axis.

The first frame portion 200a may have a shape corresponding to the first bottom portion 100a. That is, the first frame portion 200a may be curved along a direction from the first side portion of the first bottom portion 100a towards the second side portion thereof.

The first frame portion 200a may include a first side wall 202a1 and a second sidewall 202a2 disposed facing each other, and a stage 201a disposed between the first and second sidewalls 202a1 and 202a2. The first and second sidewalls 202a1 and 202a2 may have a length longer than the stage 201a. In other words, portions of the first and second sidewalls 202a1 and 202a2 may protrude over an edge portion of the stage 201a towards the hinge portion 400. The portions of the first and second sidewalls 202a1 and 202a2 protruding over the edge portion of the stage 201a may respectively be defined as first and second sidewall protrusions 211a1 and 211a2.

The first sidewall 202a1 may have the same height as the second sidewall 202a2. The first and second sidewalls 202a1 and 202a2 may have a height larger than the stage 201a.

The first frame portion 200a may be disposed corresponding to the first bottom portion 100a, which will be described below in more detail.

The first and second sidewalls 202a1 and 202a2 and the stage 201a, which are included in the first frame portion 200a, may be disposed on the third surface 3a of the first bottom portion 100a. The first sidewall protrusion 211a1 may be disposed on corresponding edge portions of the first surface 1a and the second surface 2a. The respective edge portions of the first and second surfaces 1a and 2a may have substantially the same height as the third surface 3a. The second sidewall protrusion 211a2 may be disposed on corresponding edge portions of the first surface 1a and the second surface 2a. The respective edge portions of the first and second surfaces 1a and 2a may have substantially the same height as the third surface 3a.

The first frame portion 200a may be affixed to the first bottom portion 100a using a coupling device such as a screw. Accordingly, the first and second sidewalls 202a1 and 202a2 of the first frame portion 200a may include grooves disposed in the projections 27. The side portions 102a of the first bottom portion 100a may include a plurality of openings (e.g., holes) 96 disposed corresponding to the plurality of projections 27. The coupling device may be coupled to the grooves in the plurality of projections 27 of the first frame portion 200a through the plurality of openings (e.g., holes) 96 of the first bottom portion 100a.

The second frame portion 200b may have a shape similar to the second bottom portion 100b. That is, the second frame portion 200b may be curved along a direction from the first side portion of the second bottom portion 100b towards the second side portion thereof.

The second frame portion 200b may include a first side wall 202b1 and a second sidewall 202b2 disposed facing each other, and a stage 201b disposed between the first and second sidewalls 202b1 and 202b2. The first and second sidewalls 202b1 and 202b2 may have a length longer than the stage 201b. In other words, portions of the first and second sidewalls 202b1 and 202b2 may protrude over an edge portion of the stage 201b towards the hinge portion 400. The portions of the first and second sidewalls 202b1 and 202b2 protruding over the edge portion of the stage 201a may respectively be defined as first and second sidewall protrusions 211b1 and 211b2.

The first sidewall 202b1 may have the same height as the second sidewall 202b2. The first and second sidewalls 202b1 and 202b2 may have a height larger than the stage 201b.

The second frame portion 200b may be disposed corresponding to the second bottom portion 100b, which will be described below in more detail.

The first and second sidewalls 202b1 and 202b2 and the stage 201b, which are included in the second frame portion 200b, may be disposed on the third surface 3b of the second bottom portion 100b. The first sidewall protrusion 211b1 may be disposed on corresponding edge portions of the first surface 1b and the second surface 2b. The respective edge portions of the first and second surfaces 1b and 2b may have substantially the same height as the third surface 3b. The second sidewall protrusion 211b2 may be disposed on corresponding edge portions of the first surface 1b and the second surface 2b. The respective edge portions of the first and second surfaces 1b and 2b may have substantially the same height as the third surface 3b.

The second frame portion 200b may be affixed to the second bottom portion 100b using a coupling device such as a screw. Accordingly, the first and second sidewalls 202b1 and 202b2 of the second frame portion 200b may include grooves disposed in the projections 27. The side portions 102b of the second bottom portion 100b may include a plurality of openings (e.g., holes) 96 disposed corresponding to the plurality of projections 27. The coupling device may be coupled to the grooves in the plurality of projections 27 of the second frame portion 200b through the plurality of openings (e.g., holes) 96 of the second bottom portion 100b.

Referring to FIGS. 1 and 2, the hinge portion 400 may be disposed between the first and second frame portions 200a and 200b.

The first frame portion 200a may be rotatably coupled to one side of the hinge portion 400. The first frame portion 200a may be coupled to a first coupling portion 401 and a second coupling portion 402 of the hinge portion 400. For example, the first sidewall 202a1 may have a groove 20 in an outer side of the first sidewall 202a1 included in the first frame portion 200a and the first coupling portion 401 may be partially inserted into the groove 20. the second sidewall 202a2 may have a groove 20 in an outer side of the second sidewall 202a2 included in the first frame portion 200a and the second coupling portion 402 may be partially inserted into the groove 20.

The first and second coupling portions 401 and 402 may have a plurality of coupling holes 25 that penetrate them, respectively. The first and second sidewalls 202a1 and 202a2 of the first frame portion 200a may have a plurality of coupling grooves 24 respectively corresponding to the plurality of coupling holes 25. The coupling device, such as a screw, may be inserted into the plurality of coupling grooves 24 through the coupling holes 25, and the first coupling portion 401 may be affixed to the first sidewall 202a1 of the first frame portion 200a and the second coupling portion 402 may be affixed to the second sidewall 202a2 of the first frame portion 200a.

The second frame portion 200b may be rotatably coupled to another side of the hinge portion 400. The second frame portion 200b may be coupled to a third coupling portion 403 and a fourth coupling portion 404 of the hinge portion 400. For example, the first sidewall 202b1 may have a groove 20 in an outer side of the first sidewall 202b1 included in the second frame portion 200b and the third coupling portion 403 may be partially inserted into the groove 20. the second sidewall 202b2 may have a groove 20 in an outer side of the second sidewall 202b2 included in the second frame portion 200b and the fourth coupling portion 404 may be partially inserted into the groove 20.

The third and fourth coupling portions 403 and 404 may have a plurality of coupling holes 25 respectively that penetrate them, respectively. The first and second sidewalls 202b1 and 202b2 of the second frame portion 200b may have a plurality of coupling grooves 24 respectively corresponding to the plurality of coupling holes 25. The coupling device such as a screw may be inserted into the plurality of coupling grooves 24 through the coupling holes 25, and the third coupling portion 403 may be affixed to the first sidewall 202b1 of the second frame portion 200b and the fourth coupling portion 404 may be affixed to the second sidewall 202b2 of the second frame portion 200b.

Figure 3:
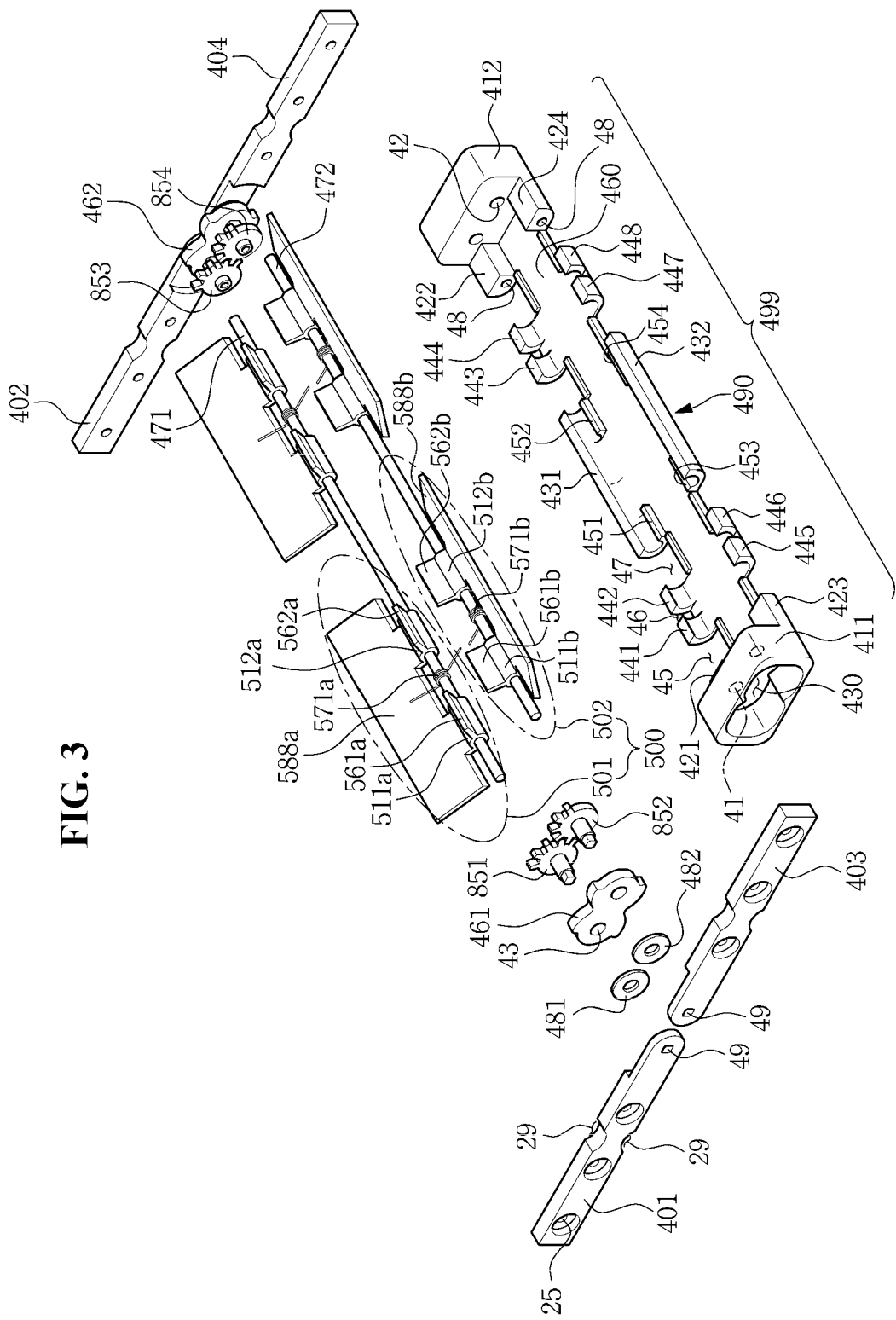
FIG. 3 is an exploded perspective view illustrating the hinge portion shown in FIG. 2, according to one or more exemplary embodiments.
Figure 4:
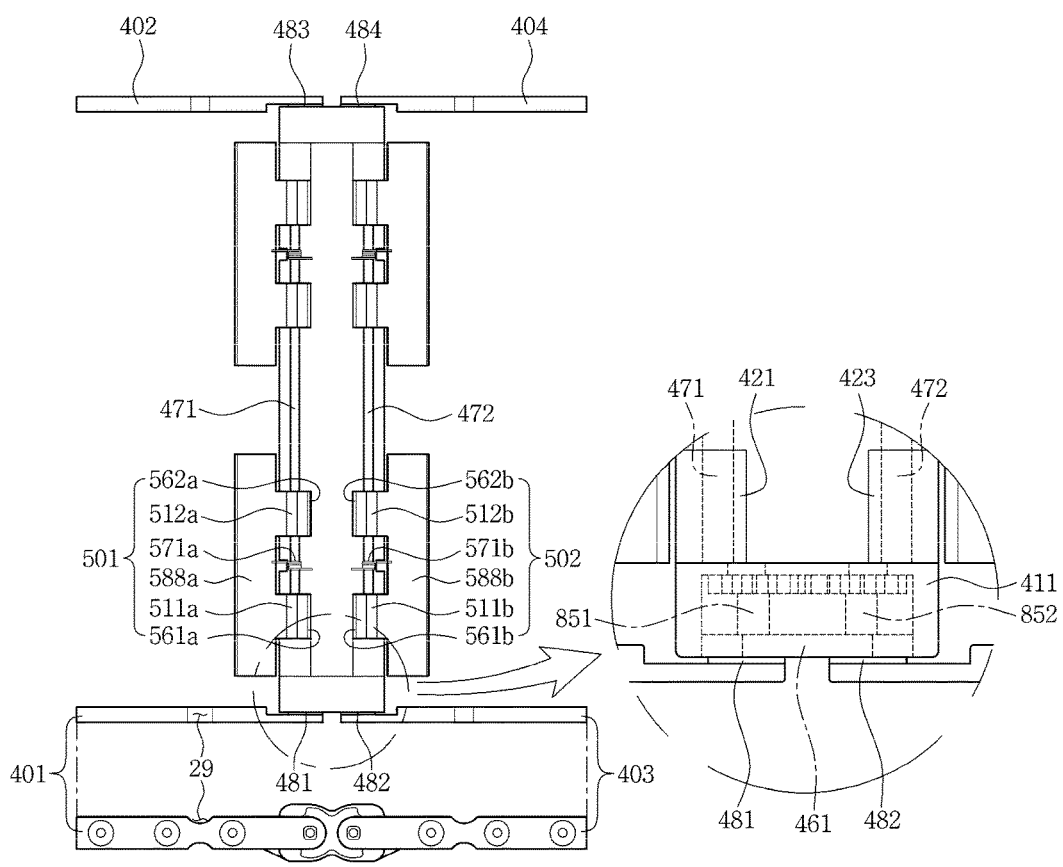
FIG. 4 is a plan view and a front view illustrating the hinge portion shown in FIG. 2, according to one or more exemplary embodiments.

The hinge portion 400 will be further described with reference to FIG. 3. FIG. 3 is an exploded perspective view illustrating the hinge portion 400 shown in FIG. 2, according to one or more exemplary embodiments. FIG. 4 is a plan view and a front view illustrating the hinge portion 400 shown in FIG. 2, according to one or more exemplary embodiments.

Referring to FIGS. 3 and 4, the hinge portion 400 may include a hinge case 499, a first hinge axis 471, a second hinge axis 472, a first gear 851, a second gear 852, a third gear 853, a fourth gear 854, a first gear cover 461, a second gear cover 462, a first washer 481, a second washer 482, a third washer 483, a fourth washer 484, a first coupling portion 401, a second coupling portion 402, a third coupling portion 403, and a fourth coupling portion 404.

The hinge case 499 may include a shaft receiving portion 490 and first and second gear receiving portions 411 and 412 respectively disposed on two opposite ends of the shaft receiving portion 490. The hinge case 499 may include a translucent material such as plastic.

The shaft receiving portion 490 may include a bottom part 460 and a first shaft fixing part 421, a plurality of first support parts 441, 442, 431, 443, and 444, a plurality of first auxiliary support parts 451 and 452, a second shaft fixing part 422, a third shaft fixing part 423 disposed along another edge portion of the bottom part 460, a plurality of second support parts 445, 446, 432, 447, and 448, a plurality of second auxiliary support parts 453 and 454, and a fourth shaft fixing part 424, disposed along edges of the bottom part 460.

The first and second shaft fixing parts 421 and 422 may be disposed facing each other. An insertion groove 48 having a predetermined depth may be defined in surfaces on the first and second shaft fixing parts 421 and 422 respectively facing each other.

The plurality of first support parts 441, 442, 431, 443, and 444 may include a first central support part 431 disposed on a middle between the first and second shaft fixing parts 421 and 422, first and second side support parts 441 and 442 disposed between the first central support part 431 and the first shaft fixing part 421, and third and fourth side support parts 443 and 444 disposed between the first central support part 431 and the second shaft fixing part 422.

The plurality of first auxiliary support parts 451 and 452 may include a first auxiliary support part 451 disposed on one side of the first central support part 431 and a second auxiliary support part 452 disposed on the other side of the first central support part 431.

A support groove may be defined in respective inner sides of the first central support part 431 and first, second, third, and fourth side support parts 441, 442, 443, and 444. An auxiliary support groove may be defined in respective inner sides of the first and second auxiliary support parts 451 and 452, which face the inner side of the first central support part 431.

An end portion of the first hinge axis 471 may be inserted into the insertion groove 48 of the first shaft fixing part 421, and the other end portion of the first hinge axis 471 may be inserted into the insertion groove 48 of the second shaft fixing part 422. A central portion of the first hinge axis 471 may be supported by the support groove of the first central support part 431 and the auxiliary support grooves of the two auxiliary support parts 451 and 452. One side of the first hinge axis 471 may be supported by the support grooves of the first and second side support parts 441 and 442, and the other side of the first hinge axis 471 may be supported by the support grooves of the third and fourth side support parts 443 and 444.

The first shaft fixing part 421, first and second side support parts 441 and 442, first central support part 431, third and fourth side support parts 443 and 444, and second shaft fixing part 422 may be spaced apart from each other, and may have an empty space therebetween. In more detail, empty spaces may be respectively disposed between the first shaft fixing part 421 and the first side support part 441, between the first and second side support parts 441 and 442, between the second side support part 442 and the first central support part 431, between the first central support part 431 and the third side support part 443, between the third and fourth side support parts 443 and 444, and between the fourth side support part 444 and the second shaft fixing part 422.

The third and fourth shaft fixing parts 423 and 424 may be disposed facing each other. An insertion groove 48 having a predetermined depth may be defined in surfaces on the third and fourth shaft fixing parts 423 and 424 respectively facing each other.

The plurality of second support parts 445, 446, 432, 447, and 448 may include a second central support part 432 disposed on a middle between the third and fourth shaft fixing parts 423 and 424, fifth and sixth side support parts 445 and 446 disposed between the second central support part 432 and the third shaft fixing part 423, and seventh and eighth side support parts 447 and 448 disposed between the second central support part 432 and the fourth shaft fixing part 424.

A support groove may be defined in respective inner sides of the second central support part 432 and fifth, sixth, seventh, and eighth side support parts 445, 446, 447, and 448. An auxiliary support groove may be defined in respective inner sides of the third and fourth auxiliary support parts 453 and 454, which face the inner side of the second central support part 432.

An end portion of the second hinge axis 472 may be inserted into the insertion groove 48 of the third shaft fixing part 423, and the other end portion of the second hinge axis 472 may be inserted into the insertion groove 48 of the fourth shaft fixing part 424. A central portion of the second hinge axis 472 may be supported by the support groove of the second central support part 432 and the auxiliary support grooves of the two auxiliary support parts 453 and 454. One side of the second hinge axis 472 may be supported by the support grooves of the fifth and sixth side support parts 445 and 446, and the other side of the second hinge axis 472 may be supported by the support grooves of the seventh and eighth side support parts 447 and 448.

The third shaft fixing part 423, fifth and sixth side support parts 445 and 446, second central support part 432, seventh and eighth side support parts 447 and 448, and fourth shaft fixing part 424 may be spaced apart from each other, and may have an empty space therebetween. In more detail, empty spaces may be respectively disposed between the third shaft fixing part 423 and the fifth side support part 445, between the fifth and sixth side support parts 445 and 446, between the sixth side support part 446 and the second central support part 432, between the second central support part 432 and the seventh side support part 447, between the seventh and eighth side support parts 447 and 448, and between the eighth side support part 448 and the fourth shaft fixing part 424.

The first gear receiving portion 411 may have a shape of a hollow case (or box). One side of the first gear receiving portion 411 may be open. The internal space of the first gear receiving portion 411 may be exposed outwards through the opening 430. Two first through holes 41 may be defined in a surface of the first gear receiving portion 411 so as to penetrate the corresponding surface. The corresponding surface of the first gear receiving portion 411 may be disposed facing or opposing the second gear receiving portion 412.

The first gear cover 461 may be fitted into the opening 430 of the first gear receiving portion 411 and cover the opening 430. The first gear cover 461 may have two second through holes 43 that penetrate the first gear cover 461. The respective second through holes 43 may be formed corresponding to the first through holes 41.

The first gear 851 may include a coupling portion including a plurality of cogs and an axis shaft disposed in the center of the coupling portion. The coupling portion and axis shaft may be integrally formed. The plurality of cogs may be provided to a part of a circumference of the coupling portion.

The first gear 851 may be disposed within a space on one side of the first gear receiving portion 411. The first gear 851 may be fitted into the corresponding first and second through holes 41 and 43. For example, one end of the axis shaft included in the first gear 851 may be inserted into one of the first through holes 41 and the other end of the axis shaft of the first gear 851 may be inserted into one of the second through holes 43 corresponding to the one first through hole 41. The other end of the axis shaft may be exposed outwards through the second through hole 43, and the exposed portion of the other end may have a quadrangle shape.

The second gear 852 may be disposed within a space on another side of the first gear receiving portion 411. The second gear 852 may include a coupling portion including a plurality of cogs and an axis shaft disposed in the center of the coupling portion. The coupling portion and axis shaft may be integrally formed. The plurality of cogs may be provided to a part of a circumference of the coupling portion.

The second gear 852 may be fitted into the corresponding first and second through holes 41 and 43. For example, one end of the axis shaft included in the second gear 852 may be inserted into the other first through hole 41 and the other end of the axis shaft of the second gear 852 may be inserted into the other second through hole 43 corresponding to the other first through hole 41. The other end of the axis shaft may be exposed outwards through the second through hole 43, and the exposed portion of the other end may have a quadrangle shape.

The first and second gears 851 and 852 may be coupled to each other. The plurality of cogs of the first gear 851 may be interlocked with the plurality of cogs of the second gear 852.

The second gear receiving portion 412 may have a shape of a hollow case (or box). One side of the second gear receiving portion 412 may be open. The internal space of the second gear receiving portion 412 may be exposed outwards through the opening. Two first through holes 41 may be defined in a surface of the second gear receiving portion 412 so as to penetrate the corresponding surface. The corresponding surface of the second gear receiving portion 412 may be disposed facing or opposing the first gear receiving portion 411.

The second gear cover 462 may be fitted into the opening of the second gear receiving portion 412 and cover the opening. The second gear cover 462 may have two second through holes 43 that penetrate the second gear cover 462. The respective second through holes 43 may be defined in places corresponding to the first through holes 41.

The third gear 853 may include a coupling portion including a plurality of cogs and an axis shaft disposed in the center of the coupling portion. The coupling portion and axis shaft may be integrally formed. The plurality of cogs may be provided to a part of a circumference of the coupling portion.

The third gear 853 may be disposed within a space on one side of the second gear receiving portion 412. The third gear 853 may be fitted into the corresponding first through holes 42 and second through holes. For example, one end of the axis shaft included in the third gear 853 may be inserted into one of the first through holes 42 and the other end of the axis shaft of the third gear 853 may be inserted into one of the second through holes corresponding to the one first through hole 42. The other end of the axis shaft may be exposed outwards through the second through hole, and the exposed portion of the other end may have a quadrangle shape.

The fourth gear 854 may be disposed within a space on another side of the second gear receiving portion 412. The fourth gear 854 may include a coupling portion including a plurality of cogs and an axis shaft disposed in the center of the coupling portion. The coupling portion and axis shaft may be integrally formed. The plurality of cogs may be provided to a part of a circumference of the coupling portion.

The fourth gear 854 may be fitted into the corresponding first through holes 42 and second through holes. For example, one end of the axis shaft included in the fourth gear 854 may be inserted into the other first through hole 42 and the other end of the axis shaft of the fourth gear 854 may be inserted into the other second through hole corresponding to the other first through hole 42. The other end of the axis shaft may be exposed outwards through the second through hole, and the exposed portion of the other end may have a quadrangle shape.

The third and fourth gears 853 and 854 may be coupled to each other. The plurality of cogs of the third gear 853 may be interlocked with the plurality of cogs of the fourth gear 854.

The first washer 481 may be disposed between the first gear cover 461 and the first coupling portion 401. The first washer 481 may have a hole that penetrates a center thereof. The exposed portion of the axis shaft of the first gear 851 may be inserted through the hole of the first washer 481 and through a coupling hole 49 of the first coupling portion 401. The other end of the axis shaft of the first gear 851 may be fitted into the coupling hole 49 of the first coupling portion 401. The other end portion of the axis shaft of the first gear 851 and the coupling hole 49 of the first coupling portion 401 may have a quadrangular shape, and therefore, a slippage between the first gear 851 and the first coupling portion 401 may be reduced.

The second washer 482 may be disposed between the first gear cover 461 and the third coupling portion 403. The second washer 482 may have a hole that penetrates a center thereof. The exposed portion of the axis shaft of the second gear 852 may be inserted through the hole of the second washer 482 and through a coupling hole 49 of the third coupling portion 403. The other end of the axis shaft of the second gear 852 may be fitted into the coupling hole 49 of the third coupling portion 403. The other end of the axis shaft of the second gear 852 and the coupling hole 49 of the third coupling portion 403 may have a quadrangular shape, and therefore, a slippage between the second gear 852 and the third coupling portion 403 may be reduced.

The third washer 483 may be disposed between the second gear cover 462 and the second coupling portion 402. The third washer 483 may have a hole that penetrates a center thereof. The exposed portion of the axis shaft of the third gear 853 may be inserted through the hole of the third washer 483 and through a coupling hole of the second coupling portion 402. The other end of the axis shaft of the third gear 853 may be fitted into the coupling hole of the second coupling portion 402. The other end portion of the axis shaft of the third gear 853 and the coupling hole of the second coupling portion 402 may have a quadrangular shape, and therefore, a slippage between the third gear 853 and the second coupling portion 402 may be reduced.

The fourth washer 484 may be disposed between the second gear cover 462 and the fourth coupling portion 404. The fourth washer 484 may have a hole that penetrates a center thereof. The exposed portion of the axis shaft of the fourth gear 854 may be inserted through the hole of the fourth washer 484 and through a coupling hole of the fourth coupling portion 404. The other end of the axis shaft of the fourth gear 854 may be fitted into the coupling hole of the fourth coupling portion 404. The other end portion of the axis shaft of the fourth gear 854 and the coupling hole of the fourth coupling portion 404 may have a quadrangular shape, and therefore, a slippage between the fourth gear 854 and the fourth coupling portion 404 may be reduced.

The first coupling portion 401 may have a shape of a long bar. One side of the first coupling portion 401 may be rotatably coupled to the axis shaft of the first gear 851, and the other side of the first coupling portion 401 may be affixed to the first sidewall 202a1 of the first frame portion 200a. A coupling hole 49 may be defined in one side of the first coupling portion 401 so as to penetrate the first coupling portion 401 and a plurality of fastening holes 25 may be defined the other side of the first coupling portion 401 so as to penetrate the first coupling portion 401. The one side of the first coupling portion 401 may have a smaller thickness than the other side thereof. Recessed grooves 29 may be defined in two sides of a central portion of the first coupling portion 401. The projection 27 defined in the first sidewall 202a1 of the first frame portion 200a may be coupled with one groove of the recessed grooves 29.

The second coupling portion 402 may have a shape of a long bar. One side of the second coupling portion 402 may be rotatably coupled to the axis shaft of the second gear 852, and the other side of the second coupling portion 402 may be affixed to the second sidewall 202a2 of the first frame portion 200a. A coupling hole may be defined in one side of the second coupling portion 402 so as to penetrate the second coupling portion 402 and a plurality of fastening holes 25 may be defined in the other side of the second coupling portion 402 so as to penetrate the second coupling portion 402. The one side of the second coupling portion 402 may have a smaller thickness than the other side thereof. Recessed grooves may be defined in two sides of a central portion of the second coupling portion 402. The projection 27 defined in the second sidewall 202a2 of the first frame portion 200a may be coupled with one groove of the recessed grooves.

The third coupling portion 403 may have a shape of a long bar. One side of the third coupling portion 403 may be rotatably coupled to the axis shaft of the third gear 853, and the other side of the third coupling portion 403 may be affixed to the first sidewall 202b1 of the second frame portion 200b. A coupling hole may be defined in one side of the third coupling portion 403 as to penetrate the third coupling portion 403 and a plurality of fastening holes may be defined in the other side of the third coupling portion 403 as to penetrate the third coupling portion 403. The one side of the third coupling portion 403 may have a smaller thickness than the other side thereof. Recessed grooves may be defined in two sides of a central portion of the third coupling portion 403. The projection defined in the first sidewall 202b1 of the second frame portion 200b may be coupled with one groove of the recessed grooves.

The fourth coupling portion 404 may have a shape of a long bar. One side of the fourth coupling portion 404 may be rotatably coupled to the axis shaft of the fourth gear 854, and the other side of the fourth coupling portion 404 may be affixed to the second sidewall 202b2 of the second frame portion 200b. A coupling hole may be defined in one side of the fourth coupling portion 404 as to penetrate the fourth coupling portion 404 and a plurality of fastening holes may be defined in the other side of the fourth coupling portion 404 as to penetrate the fourth coupling portion 404. The one side of the fourth coupling portion 404 may have a smaller thickness than the other side thereof. Recessed grooves may be formed in two sides of a central portion of the fourth coupling portion 404. The projection defined in the second sidewall 202b2 of the second frame portion 200b may be coupled with one groove of the recessed grooves.

The first to fourth coupling portions 401, 402, 403, and 404 may respectively have two recessed grooves 29, and thus the respective first to fourth coupling portions 401, 402, 403, and 404 may be used interchangeably. For example, the first coupling portion 401 may be used in place of the third coupling portion 403, and vice versa.

As illustrated in FIGS. 3 and 4, the support portion 500 may include a first support portion 501 and a second support portion 502. The first and second support portions 501 and 502 may be separated from each other. Further, the first and second support portions 501 and 502 may be symmetric to each other with respect to the Y-axis.

The support portion 500 may include one or more first support portions 501 and one or more second support portions 502. For example, according to FIG. 3, the support portion 500 includes two first support portions 501 and two second support portions 502, but the exemplary embodiments are not limited thereto.

The first support portion 501 may be rotatably coupled to the first hinge axis 471. The first support portion 501 may include a first rotation unit 511a, a second rotation unit 512a, a first support plate 588a, a second support plate 561a, a third support plate 562a, and a hinge spring 571a. According to the exemplary embodiments, the first support portion 501 may include one of either the first and second rotation units 511a and 512a, and/or two or more of first and second rotation units 511a and 512a. The first support portion 501 may include two or more of first and second support plates 588a and 561a, and/or include two or more of the hinge spring.

The first rotation unit 511a may have a shape of a cylinder. The first rotation unit 511a may have a through hole that penetrates a central portion of the first rotation unit 511a. The first rotation unit 511a may be rotatably coupled to the first hinge axis 471 through the through hole. The first rotation unit 511a may be disposed in a space 45 between the first shaft fixing part 421 and the first side support part 441.

The second rotation unit 512a may have a shape of a cylinder. The second rotation unit 512a may have a through hole that penetrates a central portion of the second rotation unit 512a. The second rotation unit 512a may be rotatably coupled to the first hinge axis 471 through the through hole. The second rotation unit 512a may be disposed in a space 47 between the second side support part 442 and the first central support part 431.

The first support plate 588a may have a shape of a long bar. One side of the first support plate 588a may be coupled to one side of the first rotation unit 511a, and the other side of the first support plate 588a may be coupled to one side of the second rotation unit 512a. The first support plate 588a may protrude from the first and second rotation units 511a and 512a towards one side of the first support portion 501.

The second support plate 561a may have a shape of a bar shorter than the first support plate 588a. The second support plate 561a may be coupled to another side of the first rotation unit 511a. The second support plate 561a may protrude from the first rotation unit 511a towards another side of the first support portion 501. The second support plate 561a may have a smaller length and width than the first support plate 588a.

The third support plate 562a may have a shape of a bar shorter than the first support plate 588a. The third support plate 562a may be coupled to another side of the second rotation unit 512a. The third support plate 562a may protrude from the second rotation unit 512a towards another side of the first support portion 501. The third support plate 562a may have a smaller length and width than the first support plate 588a. The third support plate 562a may have the same size as the second support plate 561a.

The first support plate 588a may have an angle of greater than about 45 degrees with the second support plate 561a. For example, the first support plate 588a may have an angle of about 90 degrees with the second support plate 561a.

The first support plate 588a may have an angle of greater than about 45 degrees with the third support plate 562a. In an exemplary embodiment, for instance, the first support plate 588a may have an angle of about 90 degrees with the third support plate 562a.

The hinge spring 571a may be disposed in a space 46 between the first and second side support parts 441 and 442. The hinge spring 571a may be coiled around the first hinge axis 471. One end of the hinge spring 571a may extend straightly and may be disposed on the bottom part 460 of the hinge case 499, and the other end portion of the hinge spring 571a may extend straightly and may be disposed on the first support plate 588a. An angle between the first support plate 588a and the bottom part 460 may be maintained constant by means of the hinge spring 571a. When a force greater than a restoring force of the hinge spring 571a is applied on the first support plate 588a, the first support plate 588a may press the other end portion of the hinge spring 571a, and accordingly an angle between the one end portion and the other end portion of the hinge spring 571a may be reduced and energy may be stored in the hinge spring 571a.

Referring to FIG. 3, another first support portion coupled to the first hinge axis 471 may have the same shape as the above-described first support portion 501. The another first support portion may include a first rotation unit disposed in a space between the first central support part 431 and the third side support part 443, a second rotation unit disposed in a space between the fourth side support part 444 and the second shaft fixing part 422, and a hinge spring disposed in a space between the third side support part 443 and the fourth side support part 444.

The second support portion 502 may be rotatably coupled to the second hinge axis 472. The second support portion 502 may include a first rotation unit 511b, a second rotation unit 512b, a first support plate 588b, a second support plate 561b, a third support plate 562b, and a hinge spring 571b. According to the exemplary embodiments, the second support portion 502 may include one of either the first and second rotation units 511b and 512b, and/or two or more of first and second rotation units 511b and 512b. The second support portion 502 may include two or more of first and second support plates 588b and 561b, and/or include two or more of the hinge spring.

The first rotation unit 511b may have a shape of a cylinder. The first rotation unit 511b may have a through hole that penetrates a central portion of the first rotation unit 511b. The first rotation unit 511b may be rotatably coupled to the second hinge axis 472 through the through hole. The first rotation unit 511b may be disposed in a space between the third shaft fixing part 423 and the fifth side support part 445.

The second rotation unit 512b may have a shape of a cylinder. The second rotation unit 512b may have a through hole that penetrates a central portion of the second rotation unit 512b. The second rotation unit 512b may be rotatably coupled to the second hinge axis 472 through the through hole. The second rotation unit 512b may be disposed in a space between the sixth side support part 446 and the second central support part 432.

The first support plate 588b may have a shape of a long bar. One side of the first support plate 588b may be coupled to one side of the first rotation unit 511b, and the other side of the first support plate 588b may be coupled to one side of the second rotation unit 512b. The first support plate 588b may protrude from the first and second rotation units 511b and 512b towards one side of the second support portion 502.

The second support plate 561b may have a shape of a bar shorter than the first support plate 588b. The second support plate 561b may be coupled to another side of the first rotation unit 511b. The second support plate 561b may protrude from the first rotation unit 511b towards another side of the second support portion 502. The second support plate 561b may have a smaller length and width than the first support plate 588b.

The third support plate 562b may have a shape of a bar shorter than the first support plate 588b. The third support plate 562b may be coupled to another side of the second rotation unit 512b. The third support plate 562b may protrude from the second rotation unit 512b towards another side of the second support portion 502. The third support plate 562b may have a smaller length and width than the first support plate 588b. The third support plate 562b may have the same size as the second support plate 561b.

The first support plate 588b may have an angle of greater than about 45 degrees with the second support plate 561b. For example, the first support plate 588b may have an angle of about 90 degrees with the second support plate 561b.

The first support plate 588b may have an angle of greater than about 45 degrees with the third support plate 562b. In an exemplary embodiment, for instance, the first support plate 588b may have an angle of about 90 degrees with the third support plate 562b.

The hinge spring 571b may be disposed in a space between the fifth and sixth side support parts 445 and 446. The hinge spring 571b may be coiled around the second hinge axis 472. One end of the hinge spring 571b may extend straightly and may be disposed on the bottom part 460 of the hinge case 499, and the other end portion of the hinge spring 571b may extend straightly and may be disposed on the first support plate 588b. An angle between the first support plate 588b and the bottom part 460 may be maintained constant by means of the hinge spring 571b. When a force greater than a restoring force of the hinge spring 571b is applied on the first support plate 588b, the first support plate 588b may press the other end portion of the hinge spring 571b, and accordingly an angle between the one end portion and the other end portion of the hinge spring 571b may be reduced and energy may be stored in the hinge spring 571b.

Referring to FIG. 3, another second support portion coupled to the second hinge axis 472 may have the same shape as the above-described second support portion 502. The another second support portion may include a first rotation unit disposed in a space between the second central support part 432 and the seventh side support part 447, a second rotation unit disposed in a space between the eighth side support part 448 and the fourth shaft fixing part 424, and a hinge spring disposed in a space between the seventh side support part 447 and the eighth side support part 448.

Referring back to FIG. 1, the curvature adjusting portion 600 may include a first curvature adjusting portion 600a and a second curvature adjusting portion 600b. The first and second curvature adjusting portions 600a and 600b may be separated from each other. Further, the first and second curvature adjusting portions 600a and 600b may be disposed symmetric to each other with respect to the Y-axis.

The first curvature adjusting portion 600a may be configured to control a curvature of a first curved part A1 of the flexible display panel 700. In other words, the first curvature adjusting portion 600a may control a degree of curvature of the first curved part A1 so that the first curved part A1 may have a gentle (or low) curvature. The first curved part A1, as illustrated in FIG. 1, may be defined as a part of the flexible display panel 700, which is located between a center of the flexible display panel 700 and a first boundary portion. The first boundary portion may be a boundary between the stage 201a of the first frame portion 200a and the first curvature adjusting portion 600a.

The first curvature adjusting portion 600a may be disposed between one side of the hinge portion 400 and the flexible display panel 700. In more detail, the first curvature adjusting portion 600a may be disposed between the first support portion 501 coupled to the first hinge axis 471 of the hinge portion 400 and the flexible display panel 700. One side of the first curvature adjusting portion 600a may be disposed between the first and second sidewall protrusions 211a1 and 211a2 of the first frame portion 200a. The first curvature adjusting portion 600a may be hinge coupled to the stage 201a of the first frame portion 200a. A coupling structure of the first curvature adjusting portion 600a and the first frame portion 200a will be described below in more detail.

Figure 5:
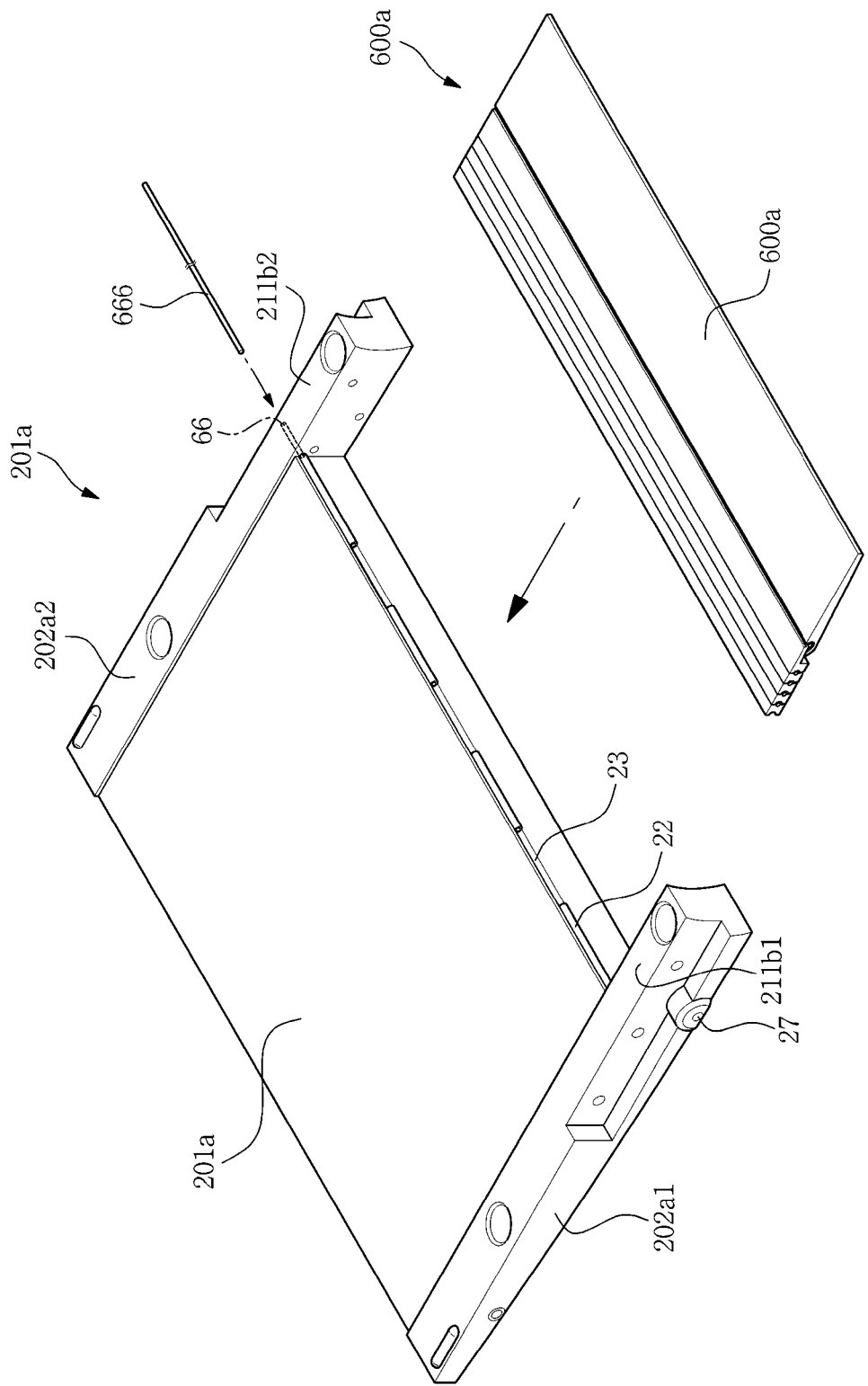
FIG. 5 is an exploded perspective view illustrating a first curvature adjusting portion and first frame portion shown in FIG. 1, separated from each other, according to one or more exemplary embodiments.

FIG. 5 is an exploded perspective view illustrating the first curvature adjusting portion 600a and the first frame portion 200a shown in FIG. 1, separated from each other, according to one or more exemplary embodiments.

Referring to FIG. 5, a plurality of projections 22 and a plurality of grooves 23 may be alternately disposed in a surface of the stage 201a of the first frame portion 200a facing the second frame portion 200b. The respective projections 22 may have a shape of a hollow cylinder. The first curvature adjusting portion 600a may include a plurality of projections having shape of a hollow cylinder and a plurality of grooves, disposed in one side of first curvature adjusting portion 600a, facing the first frame portion 200a. The plurality of projections 22 of the stage 201a of the first frame portion 200a may be inserted into the plurality of grooves of the first curvature adjusting portion 600a, and the plurality of projections of the first curvature adjusting portion 600a may be inserted into the plurality of grooves 23 of the stage 201a of the first frame portion 200a. The projections and grooves of the stage 201a of the first frame portion 200a may be coupled to respective projections and grooves of the first curvature adjusting portion 600a, by inserting a connecting shaft 666 into holes of the coupled projections so that the first curvature adjusting portion 600a may be hinge coupled to the first frame portion 200a. The connecting shaft 666 may be coupled to the stage 201a of the first frame portion 200a through a through hole 66 that penetrates the second sidewall protrusion 211a2.

Figure 6:
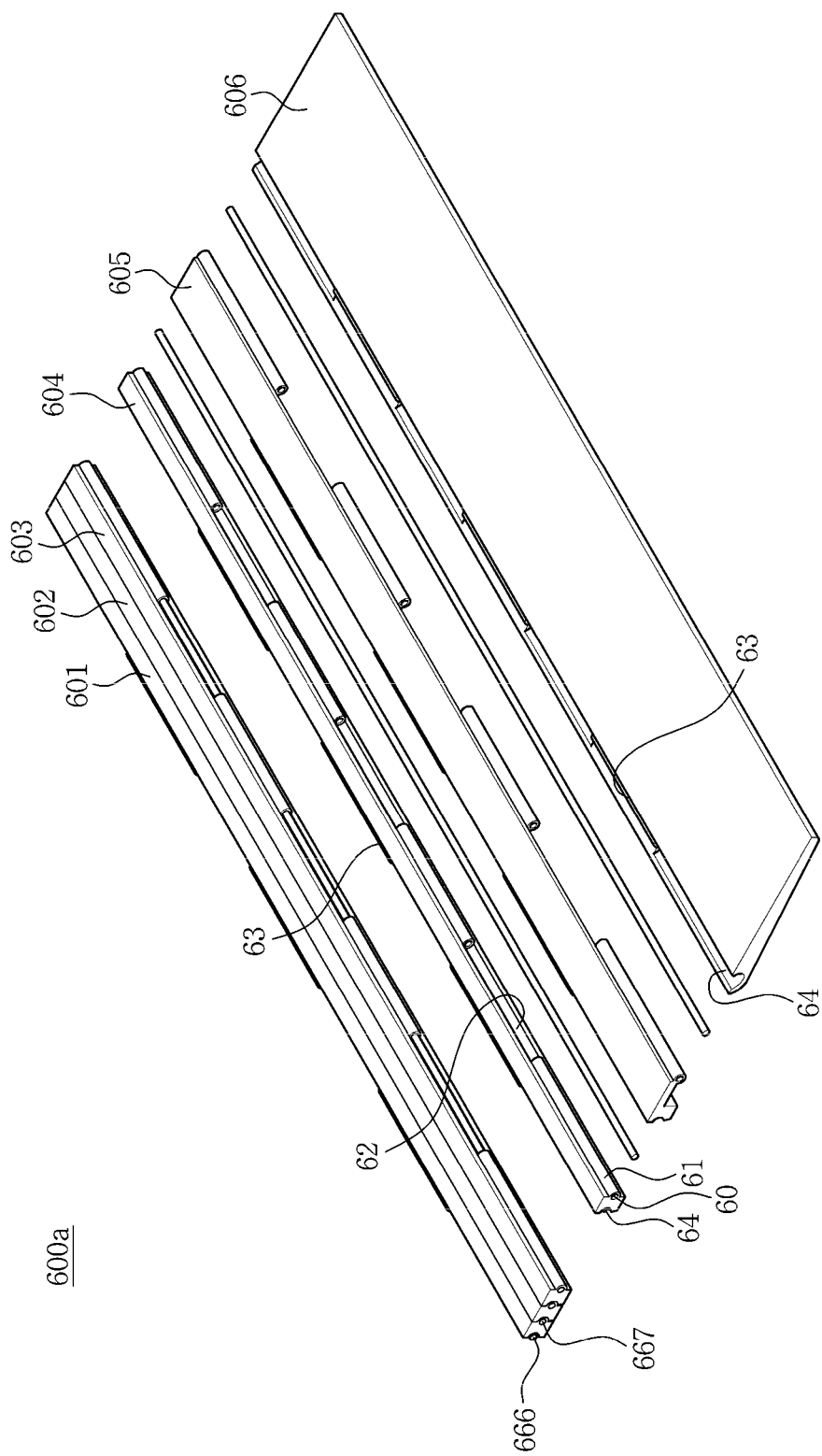
FIG. 6 is an exploded perspective view illustrating the first curvature adjusting portion shown in FIG. 5 according to one or more exemplary embodiments.

FIG. 6 is an exploded perspective view illustrating the first curvature adjusting portion 600a shown in FIG. 5 according to one or more exemplary embodiments. FIG. 7(a) is a plan view illustrating a structure of the first frame portion 200a and the first curvature adjusting portion 600a coupled to each other according to one or more exemplary embodiments, and FIGS. 7(b) and 7 (c) are cross-sectional views respectively taken along sectional lines I-I' and II-II' of the structure of the first frame portion and the first curvature adjusting portion, according to one or more exemplary embodiments. That is, FIG. 7(a) is a plan view, FIG. 7(b) is a cross-sectional view taken along sectional line I-I' of FIG. 7(a), and FIG. 7(c) is a cross-sectional view taken along sectional line II-II' of FIG. 7(a).

According to FIGS. 6, 7(a), 7(b), and 7(c), the first curvature adjusting portion 600a, may include a plurality of adjustment units 601, 602, 603, 604, 605, and 606 and a plurality of connecting shafts 667. The plurality of adjustment units 601, 602, 603, 604, 605, and 606 may be hinge coupled to each other by the plurality of connecting shafts 667. FIGS. 6, 7(a), 7(b), and 7(c) illustrates that the first curvature adjusting portion 600a includes six adjustment units 601, 602, 603, 604, 605, and 606 hinge coupled to each other, but the exemplary embodiments are not limited thereto. That is, the first curvature adjusting portion 600a may include a number of the adjustment unit(s) larger or smaller than the six units illustrated.

According to FIG. 6, the first to sixth adjustment units 601, 602, 603, 604, 605, and 606 may have a shape of a bar having a length larger than a width. The first to sixth adjustment units 601, 602, 603, 604, 605, and 606 may all have the same width or at least two adjustment units thereof may have different widths from each other.

At least one first projection 61 and at least one first groove 62 may be alternately formed in one lateral surface of each of the first to fifth adjustment units 601, 602, 603, 604, and 605, and at least one second projection 63 and at least one second groove 64 may be alternately formed in another lateral surface of each of the first to fifth adjustment units 601, 602, 603, 604, and 605 opposite to the one lateral surface thereof. The at least one second groove 64 may be formed corresponding to the at least one first projection 61, and the at least one second projection 63 may be defined corresponding to the at least one first groove 62.

The at least one second projection 63 and the at least one second groove 64 may be alternately defined in a surface of the sixth adjustment unit 606 disposed closest to the hinge portion 400.

The at least one first and second projections 61 and 63 may have holes formed through central portions thereof, respectively.

The at least one first and second projections 61 and 63 may have a convex shape, and the at least one first and second grooves 62 and 64 may have a concave shape.

The first projection 61 formed on one of the adjustment units may be disposed facing the second groove 64 respectively formed on adjacent adjustment units. The first projection 61 may be inserted into the facing second groove 64. The projections 61 and 63 may be coupled to respective grooves 62 and 64 of the adjacent adjustment units, and the connecting shaft 667 may be inserted into the holes of the projections 61 and 63. In the way, the adjacent adjustment units may be hinge coupled to each other.

For example, the first projection 61 of the fourth adjustment unit 604 may be inserted into the second groove 64 of the fifth adjustment unit 605, and the second projection 63 of the fourth adjustment unit 604 may be inserted into the first groove 62 of the third adjustment unit 603. Accordingly, the projections and grooves of the third to fifth adjustment units 603, 604, and 605 may be coupled to each other, and the connecting shafts 667 may be inserted into the holes of the projections.

Figure 8:
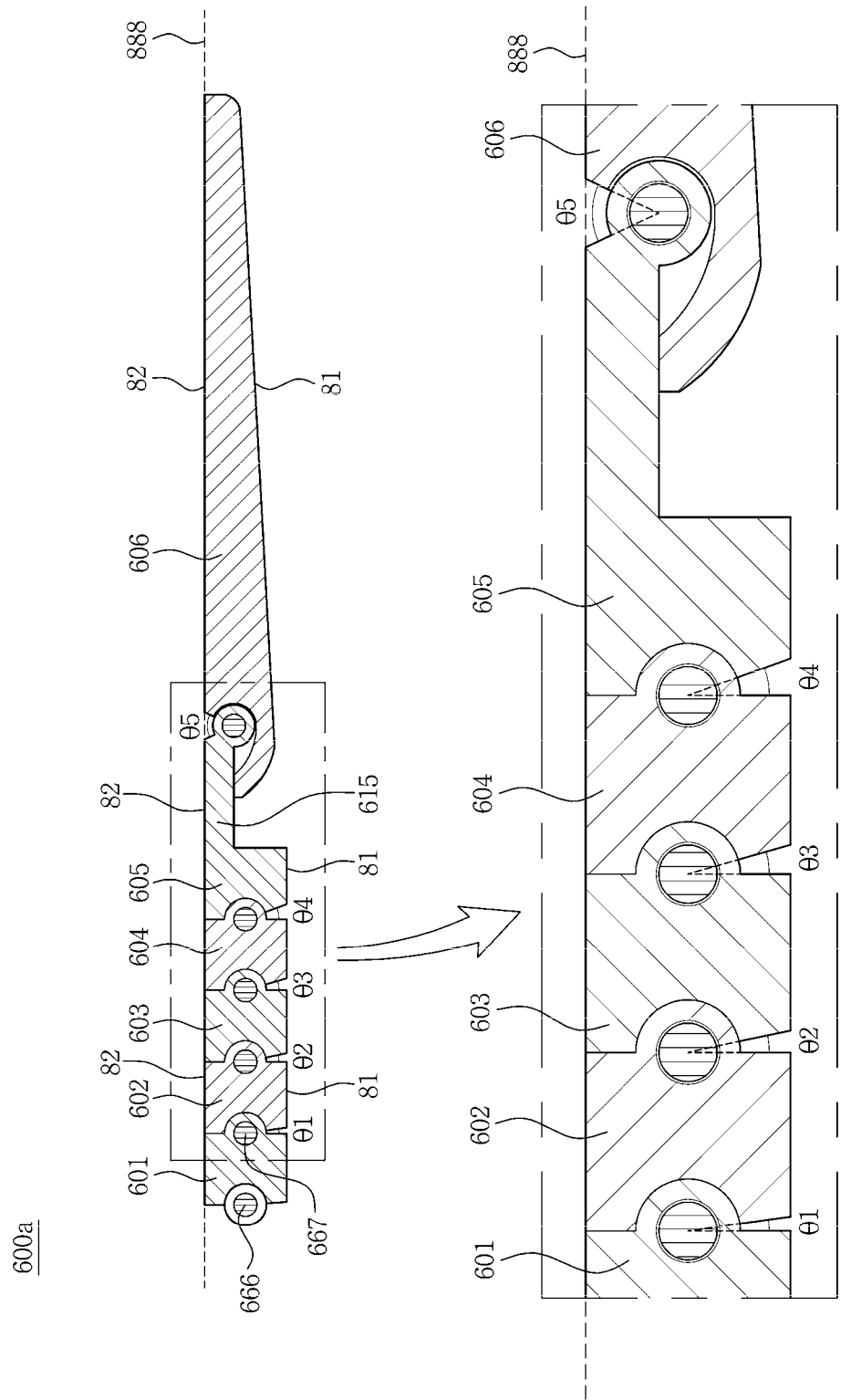
FIG. 8 is a cross-sectional view of a first curvature adjusting portion and an enlarged view illustrating adjustment units, according to one or more exemplary embodiments.

FIG. 8 is a cross-sectional view of the first curvature adjusting portion 600*a* and an enlarged view illustrating adjustment units according to one or more exemplary embodiments.

At least two of the adjustment units included in the first curvature adjusting portion 600*a* may have different angular rotation ranges. For example, an adjustment unit disposed closer to the hinge portion 400 may have a larger angular rotation range. Referring to FIG. 8, the first adjustment unit 601 disposed farthest from the hinge portion 400 may have the smallest angular rotation range (zero (0) degrees) and the sixth adjustment unit 606 disposed closest to the hinge portion 400 may have the largest angular rotation range ($\theta 5$). The second adjustment unit 602 may have an angular rotation range ($\theta 1$) larger than the first adjustment unit 601, the third adjustment unit 603 may have an angular rotation range ($\theta 2$) larger than the second adjustment unit 602, the fourth adjustment unit 604 may have an angular rotation range ($\theta 3$) larger than the third adjustment unit 603, the fifth adjustment unit 605 may have an angular rotation range ($\theta 4$) larger than the fourth adjustment unit 604, and the sixth adjustment unit 606 may have an angular rotation range ($\theta 5$) larger than the fifth adjustment unit 605. The angular rotation range of the first adjustment unit 601 may be substantially zero (0) degrees.

The grooves respectively included in the first to fifth adjustment units 601, 602, 603, 604, and 605 that are closer to the hinge portion 400 may be smaller. Referring to FIG. 8, the first adjustment unit 601 may have the largest groove and the fifth adjustment unit 605 may have the smallest groove. The second adjustment unit 602 may have a groove smaller than the first adjustment unit 601, the third adjustment unit 603 may have a groove smaller than the second adjustment unit 602, the fourth adjustment unit 604 may have a groove smaller than the third adjustment unit 603, the fifth adjustment unit 605 may have a groove smaller than the fourth adjustment unit 604, and the sixth adjustment unit 606 may have a groove smaller than the fifth adjustment unit 605. The sixth adjustment unit 606 may have a groove larger than the first adjustment unit 601. In other words, the sixth adjustment unit 606 may have the largest groove among the first to sixth adjustment units 601, 602, 603, 604, 605, and 606.

The respective first to sixth adjustment units 601, 602, 603, 604, 605, and 606 may include an upper surface 82 and a lower surface 81 which may have different size from each other. For example, the second adjustment unit 602 may include the lower surface 81 that is smaller than the upper surface 82 thereof. The sixth adjustment unit 606 may include the lower surface 81 that is larger than the upper surface 82 thereof.

For example, the first adjustment unit 601 may include the upper and lower surfaces 82 and 81 having substantially identical size.

The upper surfaces 82 of the first to fourth adjustment units 601, 602, 603, and 604 may be substantially same size.

The lower surfaces 81 respectively included in the first to fifth adjustment units 601, 602, 603, 604, and 605 which are closer to the hinge portion 400 may be smaller. Referring to FIG. 8, among the first to fifth adjustment unit 601, 602, 603, 604, and 605, the first adjustment unit 601 may include the largest lower surface 81 and the fifth adjustment unit 605 may include the smallest lower surface 81. The second adjustment unit 602 may include the lower surface 81 smaller than the first adjustment unit 601, the third adjustment unit 603 may include the lower surface 81 smaller than the second adjustment unit 602, the fourth adjustment unit 604 may include the lower surface 81 smaller than the third adjustment unit 603, the fifth adjustment unit 605 may include the lower surface 81 smaller than the fourth adjustment unit 604, and the sixth adjustment unit 606 may include the lower surface 81 smaller than the fifth adjustment unit 605. The sixth adjustment unit 606 may include the lower surface 81 that is larger than that of the first adjustment unit 601. In other words, the sixth adjustment unit 606 may include the largest lower surface 81 among the first to sixth adjustment units 601, 602, 603, 604, 605, and 606.

Respective distances between the connecting shafts 666 and 667 may be substantially identical to each other. The respective distances between the two connecting shafts 667 connecting two sides of the fifth adjustment unit 605 may be different from the distances between other connecting shafts. That is, the distances between the connecting shafts 667 connecting the two sides of the fifth adjustment unit 605 may be larger than the distances between other connecting shafts since the fifth adjustment unit 605 includes a protrusion 615 protruding from one side of the fifth adjustment unit 605 towards the sixth adjustment unit 606.

One adjustment unit disposed between any two adjustment units of the first to sixth adjustment units 601, 602, 603, 604, 605, and 606 may be defined as a reference adjustment unit. For example, the fifth adjustment unit 605 may be defined as the reference adjustment unit. Accordingly, the first to fourth adjustment units 601, 602, 603, and 604 between the first frame portion 200*a* and the reference adjustment unit 605 (the fifth adjustment unit 605) may be defined as a curved adjustment unit, and the sixth adjustment unit 606 between the reference adjustment unit 605 (the fifth adjustment unit 605) and the hinge portion 400 may be defined as a straight adjustment unit. The curved adjustment units 601, 602, 603, and 604 may be hinge coupled to each other at one end portion of the reference adjustment unit 605, and the straight adjustment unit 606 may be hinge coupled at the other end portion of the reference adjustment unit 605.

An imaginary surface extending from the upper surface 82 of the reference adjustment unit 605 may be defined as a reference surface 888, and the first to fourth curved adjustment units 601, 602, 603, and 604 between the first frame portion 200a and the reference adjustment unit 605 may be rotated in a range that does not intersect (or cross) the reference surface 888, whereas the straight adjustment unit 606 between the reference adjustment unit 605 and the hinge portion 400 may be rotated in a range that the straight adjustment unit 606 intersects (or crosses) the reference surface 888. This will be further described below with reference to FIG. 9. Hereinafter, the first to sixth adjustment units will be used in place of the reference adjustment unit, the first to fourth curved adjustment units, and the straight adjustment unit.

Figure 9:
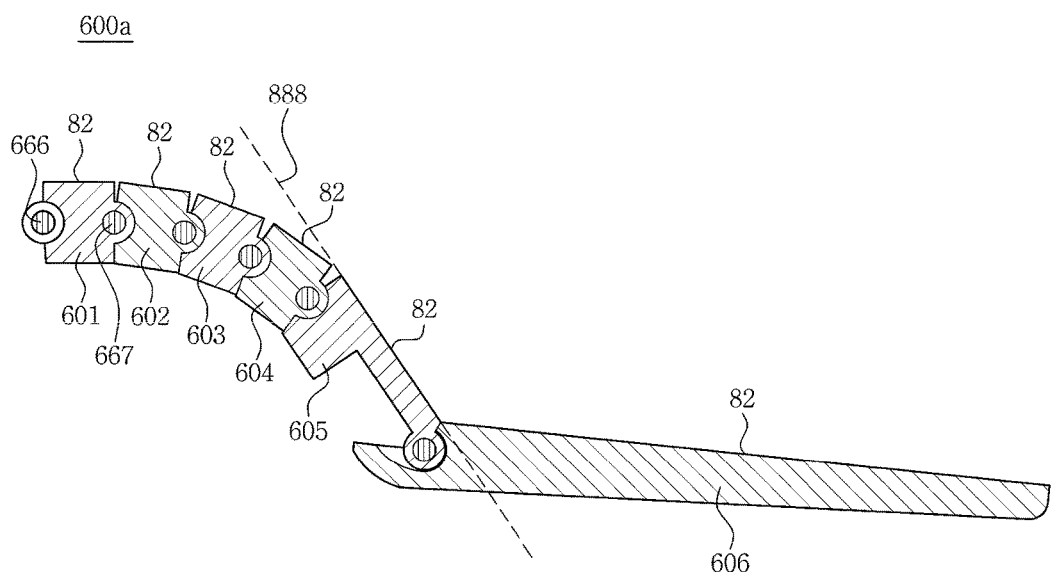
FIG. 9 is a cross-sectional view illustrating a first curvature adjusting portion when curved, according to one or more exemplary embodiments.

FIG. 9 is a cross-sectional view illustrating the first curvature adjusting portion 600a when curved, according to one or more exemplary embodiments.

As illustrated in FIG. 9, the first curvature adjusting portion 600a may be curved along a curved surface of the flexible display panel 700, and then the first to sixth adjustment units 601, 602, 603, 604, 605, and 606 may be rotated along the curved surface. The upper surfaces 82 of the respective first to fifth adjustment units 601, 602, 603, 604, and 605 do not intersect the reference surface 888, and the upper surface 82 of the sixth adjustment unit 606 intersects the reference surface 888.

The second curvature adjusting portion 600b may be configured to control a curvature of the second curved part A2 of the flexible display panel 700. In other words, the second curvature adjusting portion 600b may control a degree of curvature of the second curved part A2 that the second curved part A2 may have a gentle (or low) curvature. The second curved part A2, as illustrated in FIG. 1, may be defined as a part of the flexible display panel 700, which is located between a center of the flexible display panel 700 and a second boundary portion. The second boundary portion may be a boundary between the stage 201b of the second frame portion 200b and the second curvature adjusting portion 600b.

The second curvature adjusting portion 600b may be disposed between one side of the hinge portion 400 and the flexible display panel 700. In more detail, the second curvature adjusting portion 600b may be disposed between the second support portion 502 coupled to the second hinge axis 472 of the hinge portion 400 and the flexible display panel 700. One side of the second curvature adjusting portion 600b may be disposed between the first and second sidewall protrusions 211b1 and 211b2 of the second frame portion 200b. The second curvature adjusting portion 600b may be hinge coupled to the stage 201b of the second frame portion 200b.

A detailed configuration of the second curvature adjusting portion 600b may be substantially same as the first curvature adjusting portion 600a, and thus, will be omitted.

Referring back to FIG. 1, the flexible display panel 700 may be disposed on the mold frame 200 and the curvature adjusting portion 600. One side of the flexible display panel 700 may be placed on the stage 201a of the first frame portion 200a, and the other side of the flexible display panel 700 may be placed on the stage 201b of the second frame portion 200b. The first curved part A1 of the flexible display panel 700 may be located on the first curvature adjusting portion 600a and the second curved part A2 of the flexible display panel 700 may be located on the second curvature adjusting portion 600b.

The flexible display panel 700 may be substantially divided into two areas; a display area 700a and a non-display area 700b. The display area 700a may be configured to display an image and the non-display area 700b may include signal lines configured to transmit image data for image display, control signals and power signals. The non-display area 700b may include a driver circuit board including at least one driver circuit unit configure to provide the image data, control signals and power signals.

The flexible display panel 700 may include a liquid crystal display (LCD) panel, an organic light emitting diode display (OLED) panel, a plasma display panel, an electrophoretic display panel, and the like, but exemplary embodiments are not limited thereto. The flexible display panel 700 may be any flexible display panel that is bendable and foldable.

Referring back to FIG. 1, the top chassis 800 may have an opening through which the display area 700a of the flexible display panel 700 and a part of the hinge portion 400 are exposed. That is, the top chassis 800 may have a quadrangular frame shape including an opening in the center of the top chassis 800. The top chassis 800 may include a first top portion 800a and a second top portion 800b. The first and second top portions 800a and 800b may be separated from each other. The first and second top portions 800a and 800b may be symmetric to each other with respect to the Y-axis.

The first top portion 800a may be placed on the first and second sidewalls 202a1 and 202a2 of the first frame portion 200a and a first side portion 900a of a side case 900 that will be described below. The first top portion 800a may be affixed to the first and second sidewalls 202a1 and 202a2 and the first side portion 900a using a coupling device such as a screw.

The second top portion 800b may be placed on the first and second sidewalls 202b1 and 202b2 of the second frame portion 200b and a second side portion 900b of the side case 900 that will be described below. The second top portion 800b may be affixed to the first and second sidewalls 202b1 and 202b2 and the second side portion 900b using the coupling device such as a screw.

Referring back to FIG. 1, the side case 900 may include the first side portion 900a and the second side portion 900b. The first and second side portions 900a and 900b may be separated from each other. The first and second side portions 900a and 900b may be symmetric to each other with respect to the Y-axis.

The first side portion 900a may be disposed on an edge portion of the first bottom portion 100a. The first side portion 900a may be attached to a lower surface of the first top portion 800a. The first side portion 900a may be affixed to the first top portion 800a using the coupling device.

The second side portion 900b may be disposed on an edge portion of the second bottom portion 100b. The second side portion 900b may be attached to a lower surface of the second top portion 800b. The second side portion 900b may be affixed to the second top portion 800b using the coupling device.

Figure 10:
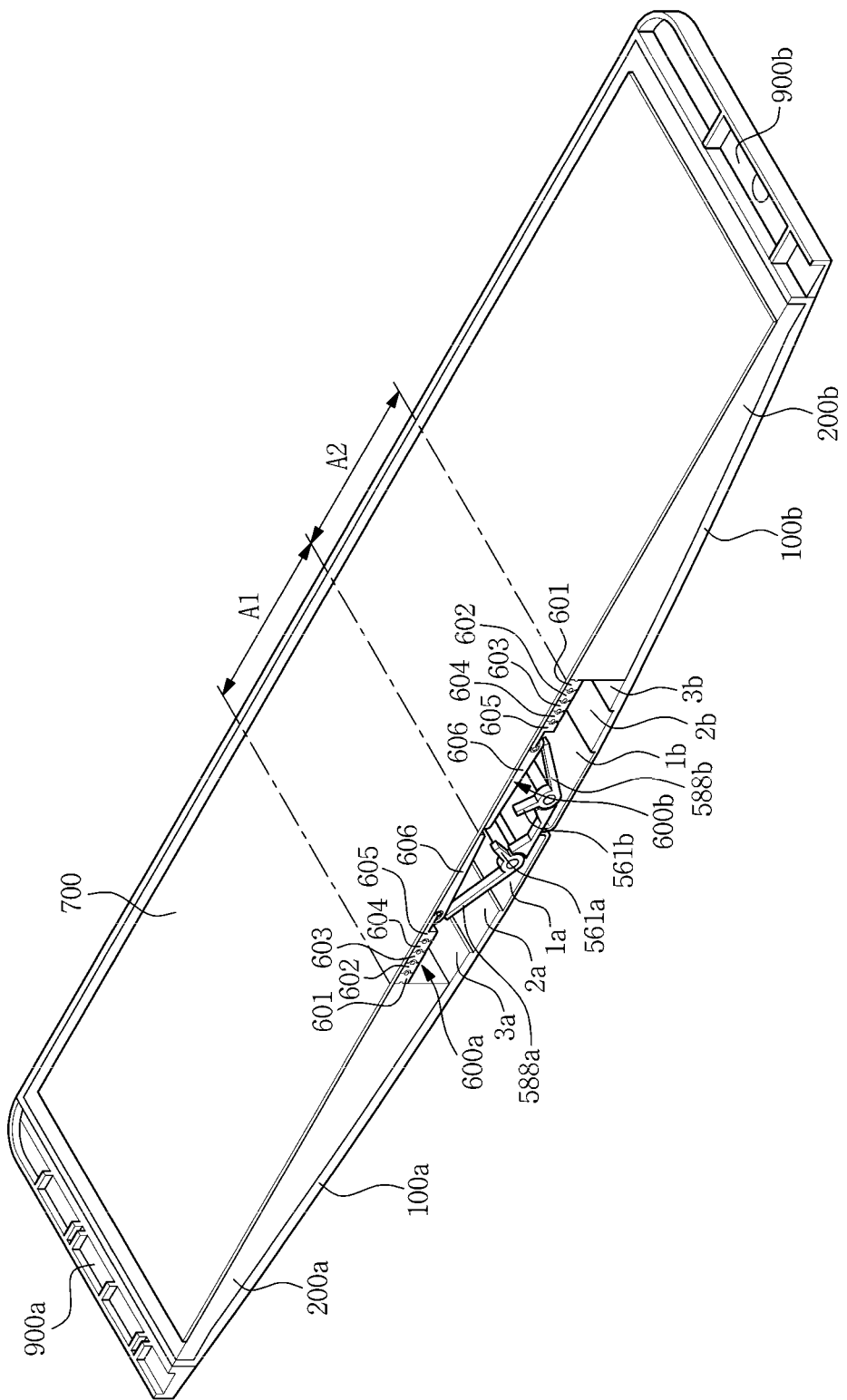
FIG. 10 is a perspective view illustrating an unfolded display device including a first curvature adjusting portion, a second curvature adjusting portion, a first support portion and a second support portion according to on roe more exemplary embodiments.

FIG. 10 is a perspective view illustrating an unfolded display device including the first curvature adjusting portion 600a, the second curvature adjusting portion 600b, the first support portion 501 and the second support portion 502 according to one or more exemplary embodiments.

According to FIG. 10, the unfolded display device may include the unfolded flexible display panel 700. The adjustment units 601, 602, 603, 604, 605, and 606 of the first curvature adjusting portion 600a and the adjustment units 601, 602, 603, 604, 605, and 606 of the second curvature adjusting portion 600b may be aligned with respect to the reference surface 888.

Accordingly, the respective upper surfaces of the first to sixth adjustment units 601, 602, 603, 604, 605, and 606 of the first curvature adjusting portion 600a may be in contact with the flexible display panel 700, and the respective upper surfaces of the first to sixth adjustment units 601, 602, 603, 604, 605, and 606 of the second curvature adjusting portion 600b may be in contact with the flexible display panel 700.

The first support plate 588a of the first support portion 501 may be configured to support one side of the sixth adjustment unit 606 included in the first curvature adjusting portion 600a, and the second and third support plates 561a and 562a of the first support portion 501 may be configured to support the other side of the sixth adjustment unit 606 included in the first curvature adjusting portion 600a.

The first support plate 588b of the second support portion 502 may be configured to support one side of the sixth adjustment unit 606 included in the second curvature adjusting portion 600b, and the second and third support plates 561b and 562b of the second support portion 502 may be configured to support the other side of the sixth adjustment unit 606 included in the second curvature adjusting portion 600b.

Figure 11:
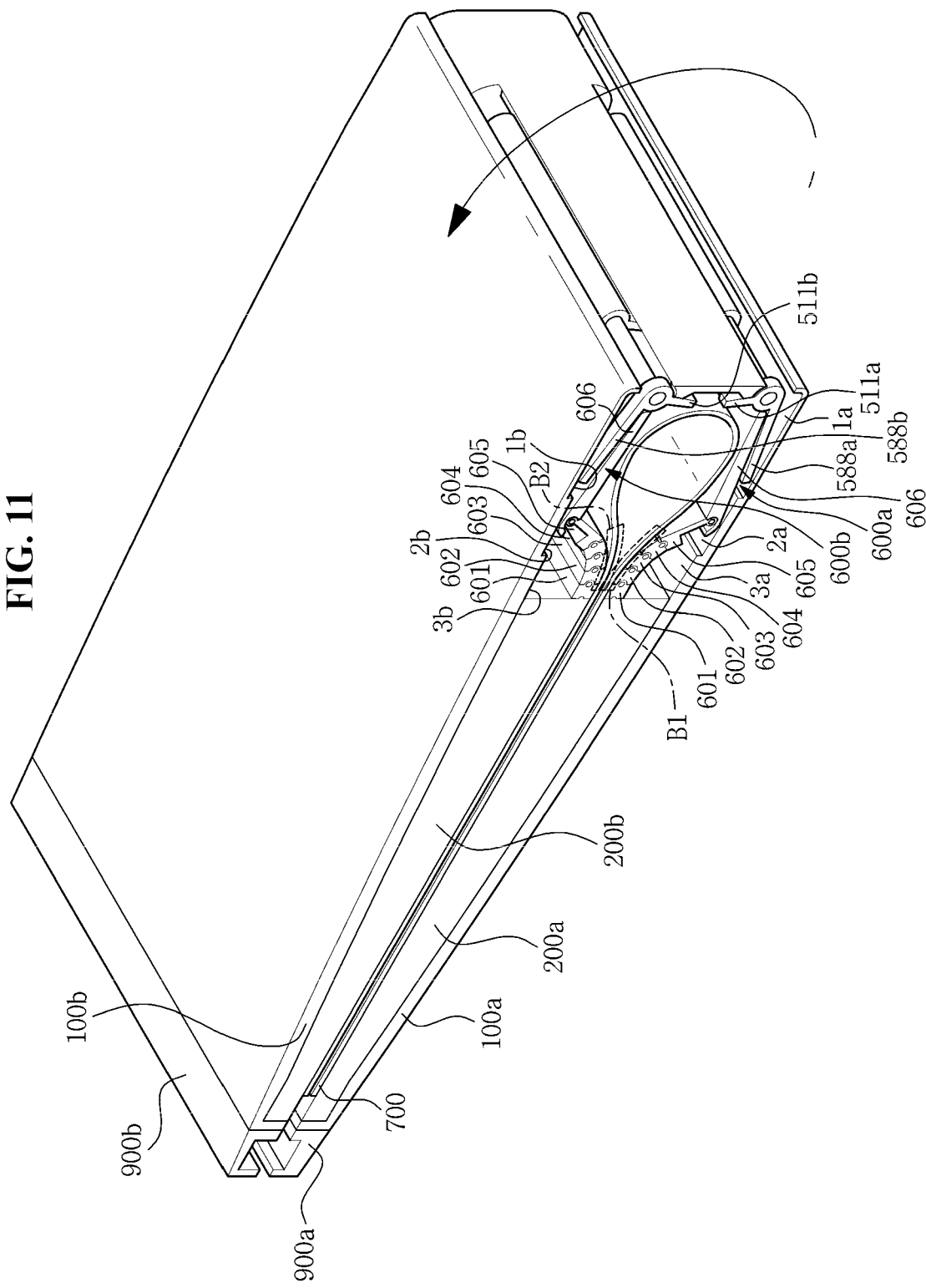
FIG. 11 is a perspective view illustrating a folded display device including a first curvature adjusting portion, a second curvature adjusting portion, a first support portion and a second support portion according to one or more exemplary embodiments.

FIG. 11 is a perspective view illustrating a folded display device including the first curvature adjusting portion 600a, the second curvature adjusting portion 600b, the first support portion 501 and the second support portion 502 according to one or more exemplary embodiments.

According to FIG. 11, the folded display device may include the folded flexible display panel 700. Since the flexible display panel 700 is folded, the first curved part A1 may apply pressure on the first curvature adjusting portion 600a. Accordingly, the first to sixth adjustment units 601, 602, 603, 604, 605, and 606 of the first curvature adjusting portion 600a may be moved towards the first bottom portion 100a rotated about the respective connecting shafts 667. Therefore, the upper surfaces 82 of the first to fifth adjustment units 601, 602, 603, 604, and 605 of the first curvature adjusting portion 600a may be curved. The coupling portion between the fifth and sixth adjustment units 605 and 606 of the first curvature adjusting portion 600a may be disposed on the second surface 2a of the first bottom portion 100a. The first support plate 588a included in the first support portion 501 may be rotated towards the first bottom portion 100a, and one side of the first support plate 588a may be disposed on the first surface 1a of the first bottom portion 100a by the rotation. One side of the sixth adjustment unit 606 of the first curvature adjusting portion 600a may be moved to a space between the first and second support plates 588a and 561a.

The first to sixth adjustment units 601, 602, 603, 604, 605, and 606 of the first curvature adjusting portion 600a may have a limited angular rotation range, and thus a curvature of the first curved part A1 may be limited. An area B1 of the first curved part A1, which is near the first boundary portion, may have a relatively high curvature according to the first curvature adjusting portion 600a. The first curvature adjusting portion 600a is configured to limit the curvature of the area B1 to a predetermined value and reduce or prevent excessive folding of the area B1 of the first curved part A1 when the display device is folded.

Similarly, since the flexible display panel 700 is folded, the second curved part A2 may apply pressure on the second curvature adjusting portion 600b. Accordingly, the first to sixth adjustment units 601, 602, 603, 604, 605, and 606 of the second curvature adjusting portion 600b may be moved towards the second bottom portion 100b rotated about the respective connecting shafts 667. Therefore, the upper surfaces 82 of the first to fifth adjustment units 601, 602, 603, 604, and 605 of the second curvature adjusting portion 600b may be curved. The coupling portion between the fifth and sixth adjustment units 605 and 606 of the second curvature adjusting portion 600b may be disposed on the second surface 2b of the second bottom portion 100b. The first support plate 588b included in the second support portion 502 may be rotated towards the second bottom portion 100b, and one side of the first support plate 588b may be disposed on the first surface 1b of the second bottom portion 100b by the rotation. One side of the sixth adjustment unit 606 of the second curvature adjusting portion 600b may be moved to a space between the first and second support plates 588b and 561b.

The first to sixth adjustment units 601, 602, 603, 604, 605, and 606 of the second curvature adjusting portion 600b may have a limited angular rotation range, and thus a curvature of the second curved part A2 may be limited. An area B2 of the second curved part A2, which is near the second boundary portion, may have a relatively high curvature according to the second curvature adjusting portion 600b. The second curvature adjusting portion 600b is configured to limit the curvature of the area B2 to a predetermined value and reduce or prevent excessive folding of the area B2 of the second curved part A2 when the display device is folded.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device comprising:
   a bottom chassis comprising a first bottom portion and a second bottom portion;
   a mold frame comprising a first frame portion and a second frame portion respectively disposed in the first and second bottom portions of the bottom chassis;
   a hinge portion configured to couple the first and second frame portions of the mold frame to each other;
   a flexible display panel disposed on the mold frame and the hinge portion;
   a first curvature adjusting portion disposed between one side of the hinge portion and the flexible display panel, the first curvature adjusting portion coupled to the first frame portion; and
   a second curvature adjusting portion disposed between the opposite side of the hinge portion and the flexible display panel, the second curvature adjusting portion coupled to the second frame portion,
   wherein a center of the flexible display panel is not in contact with the first and the second curvature adjusting portions, and
   wherein the center of the flexible display panel is disposed on a gap between the first curvature adjusting portion and the second curvature adjusting portion.

2. The display device of claim 1, wherein each of the first and second curvature adjusting portions comprises:
   a plurality of adjustment units; and
   a plurality of connecting shafts configured to hinge couple the plurality of adjustment units to each other.

3. The display device of claim 2, wherein at least two of the plurality of adjustment units have different angular rotation ranges.

4. The display device of claim 3, wherein an adjustment unit of the plurality of adjustment units that is substantially closer to the hinge portion has a larger angular rotation range.

5. The display device of claim 2, wherein at least one of the plurality of adjustment units have a upper surface and a lower surface having different lengths from each other.

6. The display device of claim 2, wherein an adjustment unit of the plurality of adjustment units disposed furthest from the hinge portion comprises a surface that comprises a projection and groove comprising a hole through which the connecting shaft is inserted.

7. The display device of claim 2, wherein each adjustment unit of the plurality of adjustment units other than an adjustment unit of the plurality of adjustment units disposed furthest from the hinge portion comprise:
   a surface comprising at least one first projection and at least one first groove having a first hole, alternately disposed, the connecting shaft is inserted through the first hole of the first groove; and
   an opposite surface comprising at least one second projection and at least one second groove having a second hole, alternately disposed, the connecting shaft is inserted through the second hole of the second groove.

8. The display device of claim 7, wherein the second groove is disposed corresponding to the first projection and the second projection is disposed corresponding to the first groove.

9. The display device of claim 7, wherein the first and second grooves disposed closer from the hinge portion is smaller than the first and second grooves disposed further from the hinge portion.

10. The display device of claim 2, wherein each of the plurality of adjustment units comprises:
    a reference adjustment unit;
    at least one curved adjustment unit between any one of the first and second frame portions and an end portion of the reference adjustment unit; and
    at least one straight adjustment unit hinge coupled to the opposite end portion of the reference adjustment unit.

11. The display device of claim 10, wherein the curved adjustment unit is configured to rotate in a range that does not intersect an imaginary reference surface extending from a surface of the reference adjustment unit; and
    wherein the straight adjustment unit is configured to rotate in a range that intersects (or crosses) the imaginary reference surface.

12. The display device of claim 1, wherein the hinge portion comprises:
    a shaft receiving portion and a hinge case comprising a first gear receiving portion and a second gear receiving portion disposed respectively on two sides of the shaft receiving portion;
    a first hinge shaft and a second hinge shaft disposed in the shaft receiving portion;
    a first gear and a second gear disposed in the first gear receiving portion, the first and second gears are interlocked with each other;
    a third gear and a fourth gear disposed in the second gear receiving portion, the third and fourth gears are interlocked with each other;
    a first gear cover covering a first opening formed in the first gear receiving portion, the first gear cover comprising through holes through which axes of the first and second gears are respectively disposed and exposed outwards;
    a second gear cover covering a second opening formed in the second gear receiving portion, the second gear cover comprising through holes through which axes of the third and fourth gears are respectively disposed and exposed outwards;
    a first coupling portion coupling the axis of the first gear to one side of the first frame portion;
    a second coupling portion coupling the axis of the third gear to the opposite side of the first frame portion;
    a third coupling portion coupling the axis of the second gear to one side of the second frame portion; and
    a fourth coupling portion coupling the axis of the fourth gear to the opposite side of the second frame portion.

13. The display device of claim 12, wherein the hinge portion further comprises a washer disposed on at least one of positions between one side of the first gear cover and the first coupling portion, between the opposite side of the first gear cover and the third coupling portion, between one side of the second gear cover and the second coupling portion, and between the opposite side of the second gear cover and the fourth coupling portion.

14. The display device of claim 12, wherein the first gear receiving portion comprises through holes into which the axes of the first and second gears are inserted; and
    wherein the second gear receiving portion comprises through holes into which the axes of the third and fourth gears are inserted.

15. The display device of claim 12, wherein the shaft receiving portion comprises:
    first fixing grooves into which two ends of the first hinge shaft are respectively inserted;
    second fixing grooves into which two ends of the second hinge shaft are respectively inserted;
    at least one first support groove configured to support a central portion of the first hinge shaft; and
    at least one second support groove configured to support a central portion of the second hinge shaft.

16. The display device of claim 12, further comprising:
    a first support portion coupled to the hinge portion, the first support portion configured to support the first curvature adjusting portion; and
    a second support portion coupled to the hinge portion, the second support portion configured to support the second curvature adjusting portion,
    wherein the first support portion is coupled to the first hinge shaft and the second support portion is coupled to the second hinge shaft.

17. The display device of claim 16, wherein the first support portion comprises:
    at least one rotation unit rotatably coupled to a first hinge axis;
    at least one first support plate protruding from the rotation unit towards one side of the first curvature adjusting portion; and
    at least one second support plate protruding from the rotation unit towards another side of the first curvature adjusting portion.

18. The display device of claim 17, further comprising at least one hinge spring coupled to the first hinge axis, one end of the hinge spring disposed on the first support plate and the other end of the hinge spring disposed on the shaft receiving portion.

19. The display device of claim 16, wherein the second support portion comprises:

at least one rotation unit rotatably coupled to a second hinge axis;

at least one first support plate protruding from the rotation unit towards one side of the second curvature adjusting portion; and at least one second support plate protruding from the rotation unit towards another side of the second curvature adjusting portion.

20. The display device of claim 19, further comprising at least one hinge spring coupled to the second hinge axis, one end of the hinge spring disposed on the first support plate and an other end of the hinge spring disposed on the shaft receiving portion.

21. The display device of claim 1, wherein the first curvature adjusting portion has limited angular rotation range and is configured to limit a curvature of a first boundary portion of the flexible display panel, the first boundary portion of the flexible display panel overlapping a boundary between the first frame portion and the first curvature adjusting portion, and wherein the second curvature adjusting portion has limited angular rotation range and is configured to limit a curvature of a second boundary portion of the flexible display panel, the second boundary portion of the flexible display panel overlapping a boundary between the second frame portion and the second curvature adjusting portion.

* * * * *